(12) United States Patent
Sasaki

(10) Patent No.: US 9,489,748 B2
(45) Date of Patent: Nov. 8, 2016

(54) IMAGE PROCESSING APPARATUS AND METHOD, IMAGE PROCESSING SYSTEM, AND NON-TRANSITORY COMPUTER READABLE MEDIUM

(71) Applicant: FUJI XEROX CO., LTD., Minato-ku, Tokyo (JP)

(72) Inventor: Makoto Sasaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/479,879

(22) Filed: Sep. 8, 2014

(65) Prior Publication Data
US 2015/0248774 A1 Sep. 3, 2015

(30) Foreign Application Priority Data
Feb. 28, 2014 (JP) .................................. 2014-039870

(51) Int. Cl.
| | |
|---|---|
| *G06T 7/40* | (2006.01) |
| *G06T 7/00* | (2006.01) |
| *H04N 9/64* | (2006.01) |
| *H04N 9/68* | (2006.01) |
| *H04N 1/60* | (2006.01) |

(52) U.S. Cl.
CPC .............. *G06T 7/408* (2013.01); *G06T 7/0081* (2013.01); *H04N 1/60* (2013.01); *H04N 9/643* (2013.01); *H04N 9/68* (2013.01); *G06T 2207/10024* (2013.01); *G06T 2207/20141* (2013.01)

(58) Field of Classification Search
None
See application file for complete search history.

(56) References Cited

U.S. PATENT DOCUMENTS

| | | | | |
|---|---|---|---|---|
| 2007/0110305 | A1* | 5/2007 | Corcoran | G06T 5/00 382/167 |
| 2008/0118156 | A1* | 5/2008 | Okada | G06K 9/00228 382/195 |
| 2011/0249863 | A1* | 10/2011 | Ohashi | G06T 7/0081 382/103 |
| 2013/0235069 | A1* | 9/2013 | Ubillos | G09G 5/026 345/594 |
| 2013/0258118 | A1* | 10/2013 | Felt | A45D 44/005 348/207.1 |
| 2015/0118655 | A1* | 4/2015 | Yamanashi | A45D 44/00 434/100 |
| 2015/0160839 | A1* | 6/2015 | Krishnaswamy | G06F 3/04845 715/810 |
| 2015/0169169 | A1* | 6/2015 | Andersson | G06F 3/0488 715/765 |
| 2015/0213303 | A1* | 7/2015 | Jain | G06K 9/00221 382/118 |
| 2015/0248774 | A1* | 9/2015 | Sasaki | G06T 7/408 382/167 |

FOREIGN PATENT DOCUMENTS

| | | |
|---|---|---|
| JP | 2010-146378 A | 7/2010 |
| JP | 2012-146071 A | 8/2012 |

OTHER PUBLICATIONS

Vladimir Vezhnevets, et al., "GrowCut—Interactive Multi-Label N-D Image Segmentation by Cellular Automata", Proc. Graphicon, 2005, pp. 150-156.

* cited by examiner

*Primary Examiner* — Sean Motsinger
(74) *Attorney, Agent, or Firm* — Sughrue Mion, PLLC

(57) ABSTRACT

An image processing apparatus includes the following elements. An image information obtaining unit obtains image information concerning a first image. A position information obtaining unit obtains first position information indicating a representative position of a specified region which has been specified by a user from the first image as an image region to be subjected to image processing. A region detector detects the specified region from the first position information. An image processor performs image processing on the specified region.

11 Claims, 30 Drawing Sheets

FIG. 5A
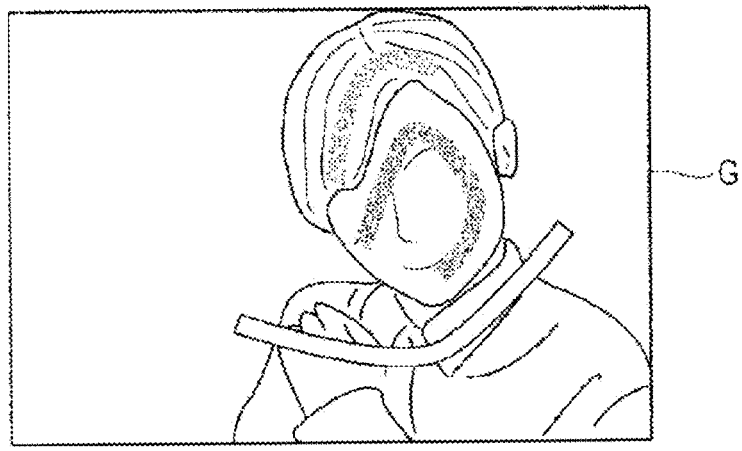
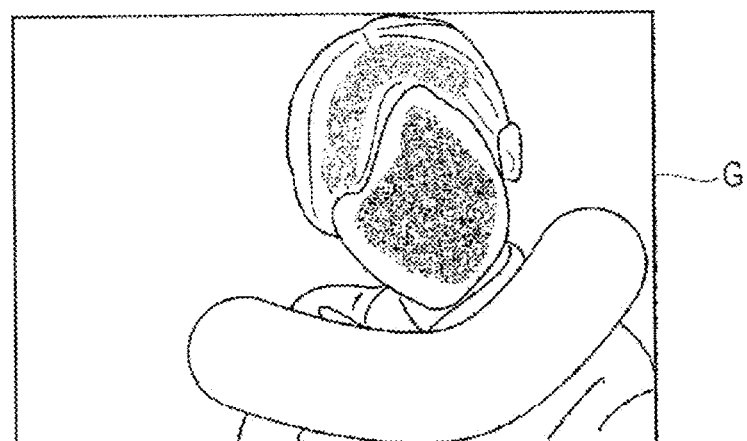
FIG. 5B
FIG. 5C
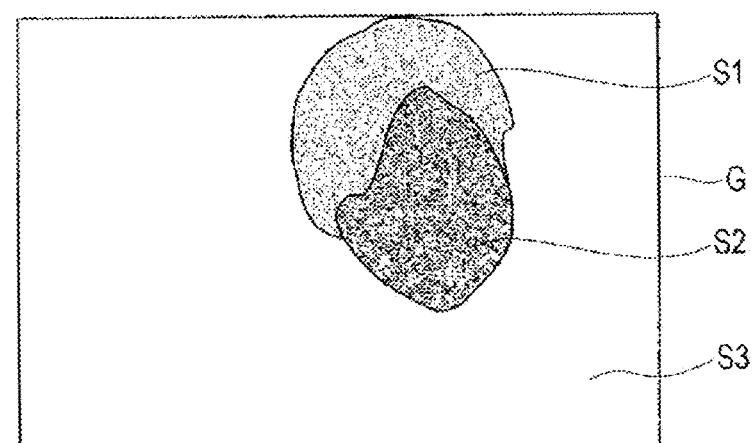

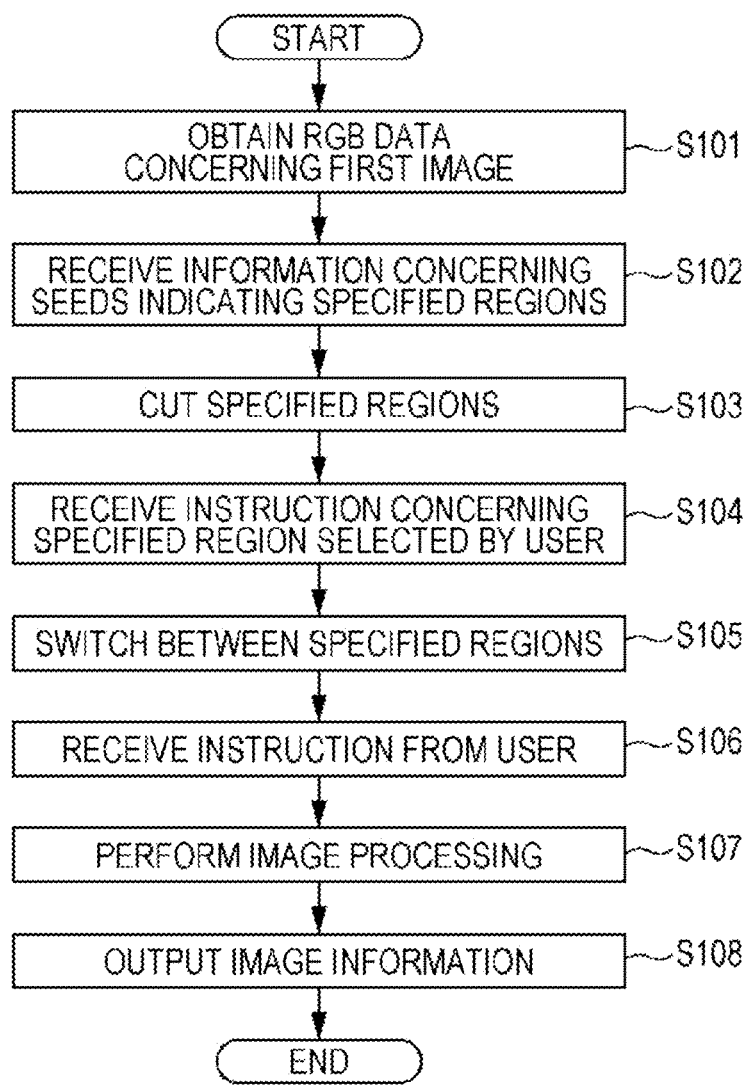

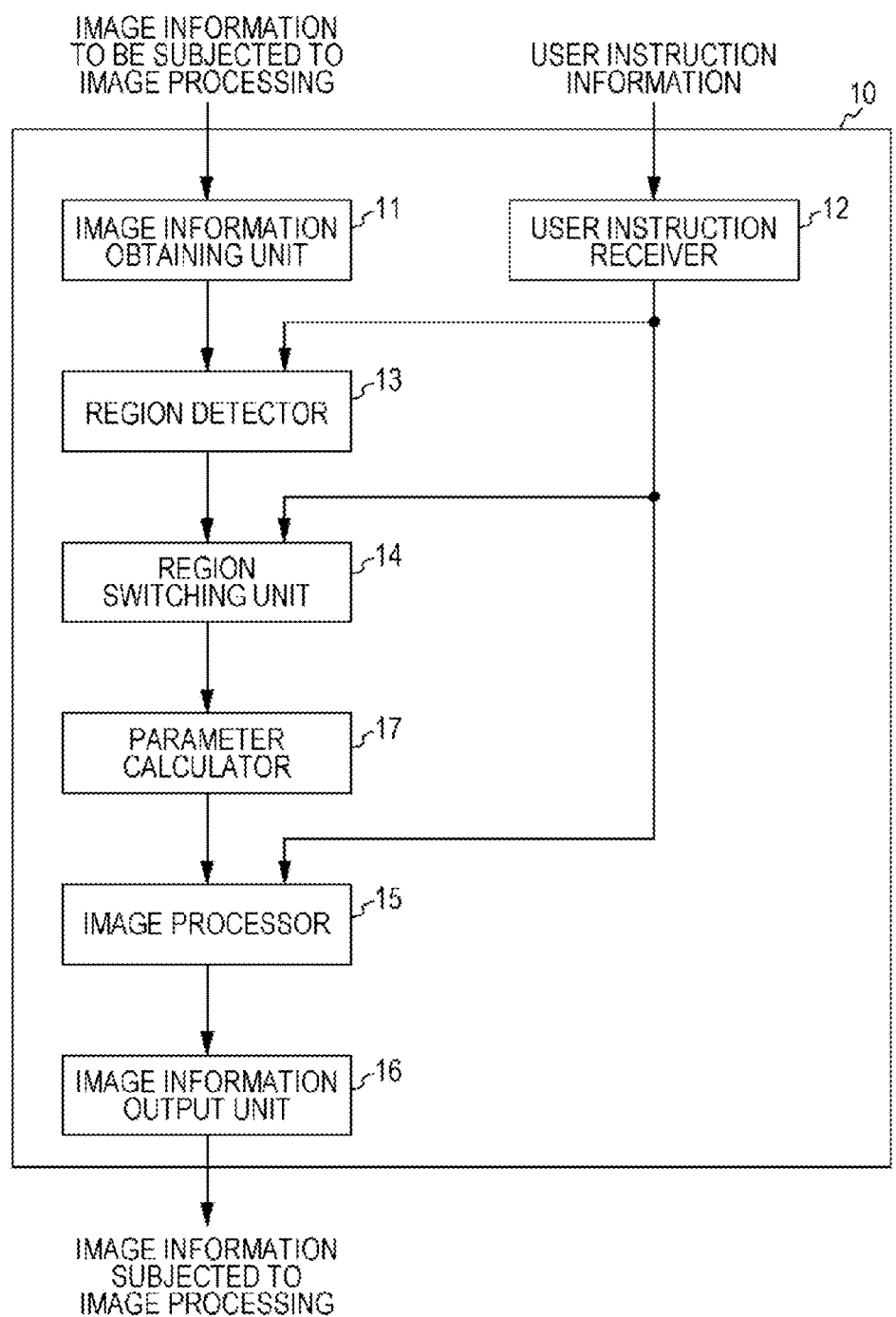

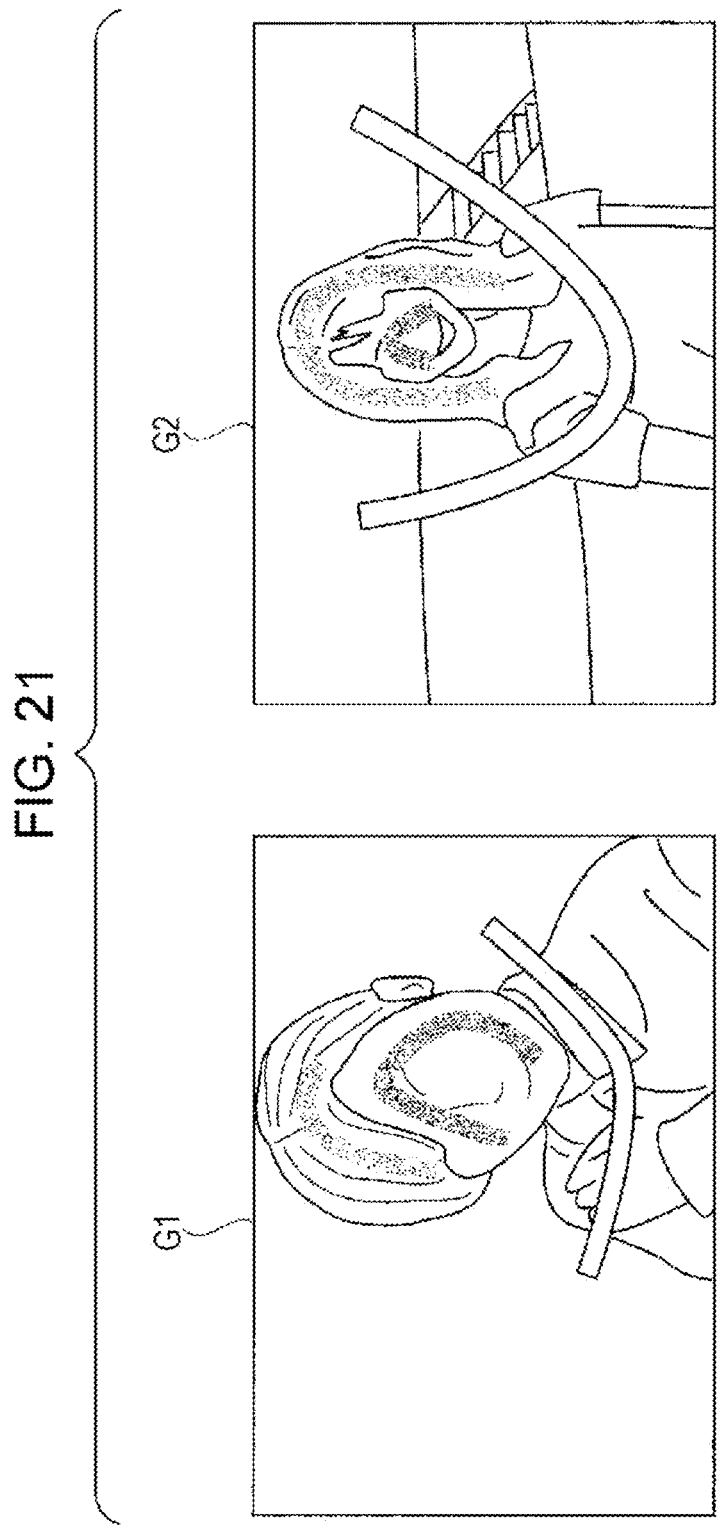

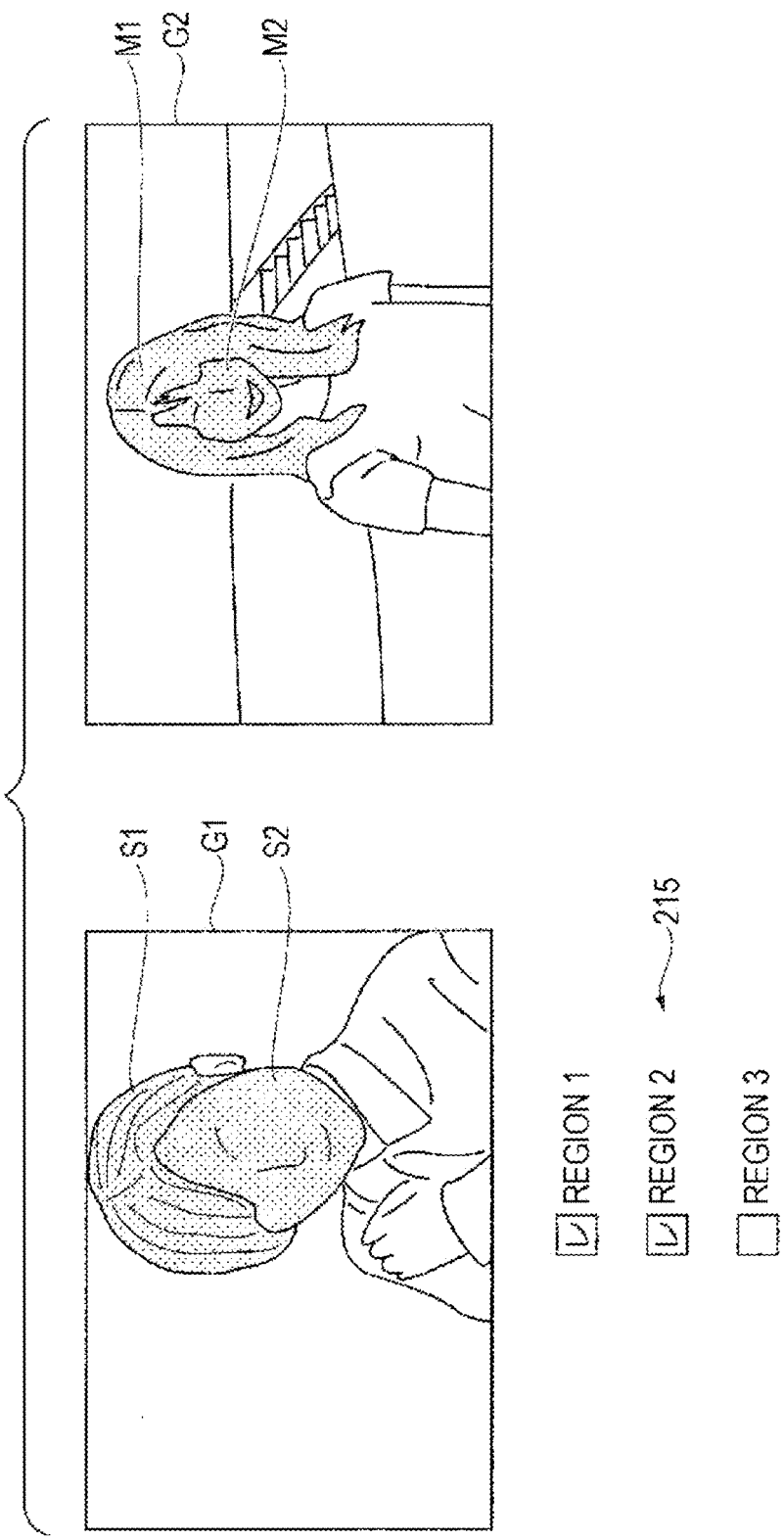

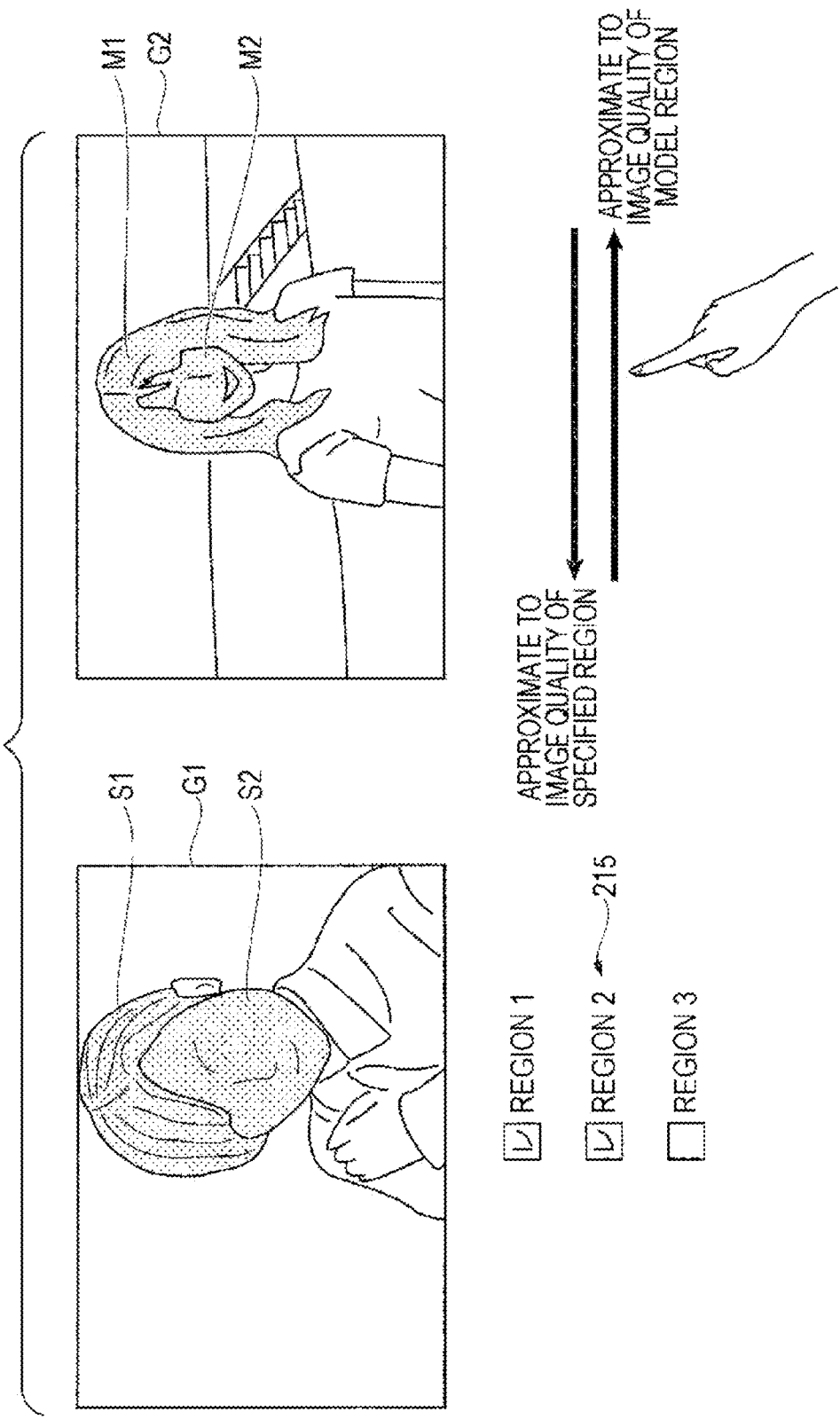

IMAGE PROCESSING APPARATUS AND METHOD, IMAGE PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-039870 filed Feb. 28, 2014.

BACKGROUND

Technical Field

The present invention relates to an image processing apparatus and method, an image processing system, and a non-transitory computer readable medium.

SUMMARY

According to an aspect of the invention, there is provided an image processing apparatus including the following elements. An image information obtaining unit obtains image information concerning a first image. A position information obtaining unit obtains first position information indicating a representative position of a specified region which has been specified by a user from the first image as an image region to be subjected to image processing. A region detector detects the specified region from the first position information. An image processor performs image processing on the specified region.

BRIEF DESCRIPTION OF THE DRAWINGS

Exemplary embodiments of the present invention will be described in detail based on the following figures, wherein:

FIGS. 5A through 5C illustrate a state in which specified regions are cut from an image shown in FIG. 3 by using a region growing technique;

FIG. 19 is a flowchart illustrating an operation performed by the image processing apparatus according to the first exemplary embodiment;

FIG. 20 is a block diagram illustrating an example of the functional configuration of an image processing apparatus according to a second exemplary embodiment;

FIG. 21 illustrates an example of a technique for cutting specified regions and model regions user-interactively;

FIG. 25A illustrates a case in which image processing for adjusting the image quality of a first specified region, which is a hair portion, to that of a first model region and image processing for adjusting the image quality of a second specified region, which is a face portion, to that of a second model region are performed at the same time;

FIG. 25B illustrates a case in which image processing is performed as a result of a user performing a swipe operation with a finger on the display screen shown in FIG. 25A;

DETAILED DESCRIPTION

Figure 1:
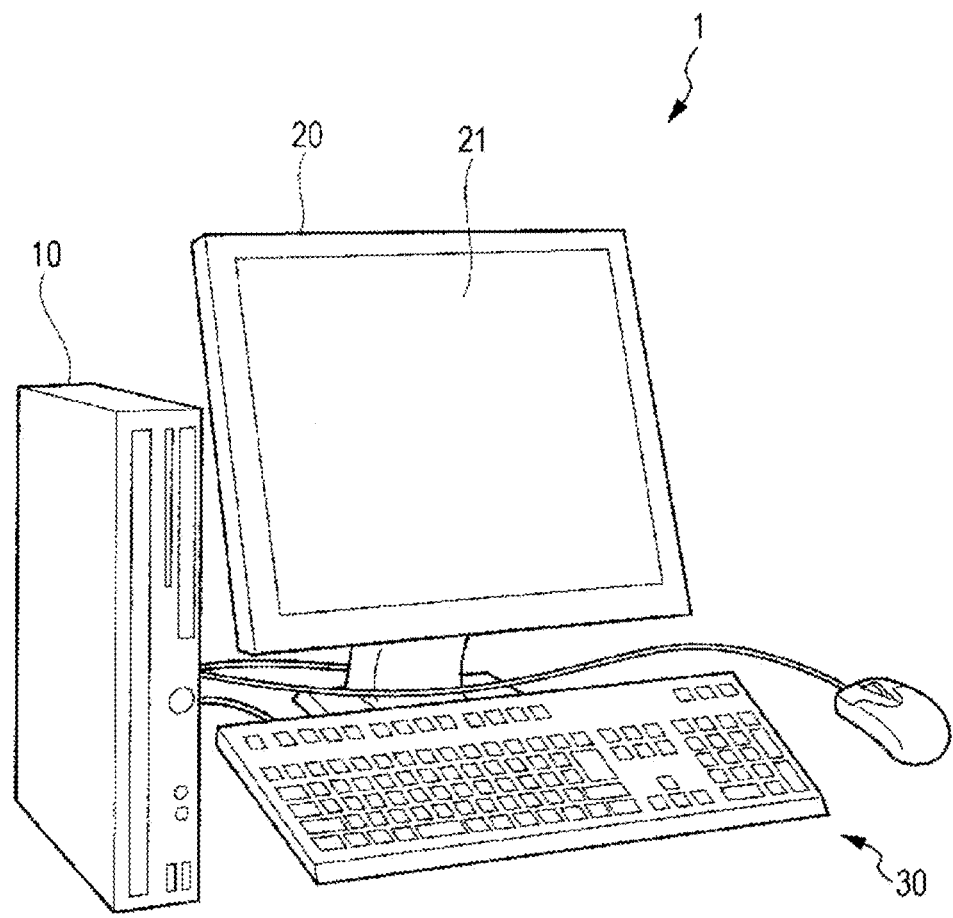
FIG. 1 illustrates an example of the configuration of an image processing system according to an exemplary embodiment of the invention.

Exemplary embodiments of the invention will be described below in detail with reference to the accompanying drawings.

In regard to the execution of image quality adjustment for a color image, adjustment may be performed on the entirety of a color image or on each of regions forming the color image. Elements expressing a color image are generally represented by color components, such as red, green, or blue (RGB), the luminance and chrominance, such as L*a*b*, or the hue, saturation, and value, such as HSV. Typical examples of image quality control are color-component histogram control, luminance contrast control, luminance histogram control, luminance bandwidth control, hue control, and saturation control. Additionally, lately, there has been an increased emphasis on control for the image quality representing the visibility, such as Retinex. If the image quality based on the color or the bandwidth of the luminance is controlled, particularly, if image quality adjustment is performed only on a specific region, processing for cutting this specific region is necessary.

There is a known technique for making it easy for a user to perform an operation for adjusting the image quality.

For example, there is a technique in which a specific region is cut, and then, a hue adjustment indicator (slider) and a saturation adjustment indicator (slider) are displayed such that they circumscribe the cut region.

If image quality adjustment is performed manually by referring to models, the skill to judge the image quality is necessary. It is difficult, however, for a general user to reproduce the image quality adjusted by a professional.

To address such an issue, the following known technique is available. Processing patterns associated with models are stored. An original image to be subjected to image quality adjustment is given, and then, a pattern having features similar to features of the original image is searched for, and the corresponding model is obtained.

By utilizing the first known technique, a user is able to easily perform image quality adjustment for a region cut from an original image, and by utilizing the second known technique, a user is able to automatically obtain a model image and a processing result merely by providing an original image.

In the first known technique, when image quality adjustment which involves cutting of a specific region is performed, regions to be cut are generally a foreground and a background (principal subject and the other subject). If there are plural regions to be cut, a user may have to repeatedly cut such regions and process them one by one, which makes it difficult for the user to intuitively perform image quality adjustment. In the second known technique, models and image processing parameters have been associated with each other. It is difficult, however, to approximate the image quality of each of regions cut from an original image to be subjected to image quality adjustment to that of an associated model, though it is possible to roughly match the image quality of the entirety of the original image to that of a model.

On the other hand, due to a recent increase in information and communication technology (ICT) devices, the flexibility and choices in image processing is increased. Accordingly, various approaches to performing image processing or image editing may be considered, as described above. In this case, the use of an ICT device represented by, for example, a tablet terminal, makes it possible for a user to perform image processing or image editing intuitively and user-interactively by using a touch panel.

In view of the above-described situation, in an exemplary embodiment of the invention, by using an image processing system 1, which will be discussed below, a specific region is cut and image quality adjustment is performed.

Description of Image Processing System

FIG. 1 illustrates an example of the configuration of the image processing system 1 of an exemplary embodiment.

The image processing system 1 includes, as shown in FIG. 1, an image processing apparatus 10, a display device 20, and an input device 30. The image processing apparatus 10 performs image processing on image information concerning an image displayed on the display device 20. The display device 20 receives image information generated by the image processing apparatus 10 and displays an image on the basis of this image information. A user inputs various items of information into the image processing apparatus 10 by using the input device 30.

The image processing apparatus 10 is, for example, a so-called general-purpose personal computer (PC). The image processing apparatus 10 generates image information by operating various application software programs under the control of an operating system (OS).

The display device 20 displays an image on a display screen 21. The display device 20 is constituted by a device having a function of displaying an image by utilizing additive color mixing, such as a liquid crystal display for a PC, a liquid crystal display television, or a projector. Accordingly, the display method of the display device 20 is not restricted to a liquid crystal display method. In the example shown in FIG. 1, the display screen 21 is provided in the display device 20. However, if a projector, for example, is used as the display device 20, the display screen 21 is a screen provided outside the display device 20.

The input device 30 is constituted by a keyboard, a mouse, and so on. The input device 30 is used for starting or quitting application software for performing image processing. The input device 30 is also used by a user for inputting an instruction concerning image processing to be performed into the image processing apparatus 10, and such an operation will be discussed later in detail.

The image processing apparatus 10 and the display device 20 are connected to each other via a digital visual interface (DVI). Instead of DVI, a high-definition multimedia interface (HDMI) or DisplayPort may be used.

The image processing apparatus 10 and the input device 30 are connected to each other via, for example, a universal serial bus (USB). Instead of USB, IEEE1394 or RS-232C may be used.

In the image processing system 1, on the display device 20, an original image, which is an image that has not been subjected to image processing, is displayed. Then, when a user inputs an instruction concerning image processing to be performed into the image processing apparatus 10 by using the input device 30, the image processing apparatus 10 performs image processing on image information representing the original image. A result of performing image processing is reflected in the image displayed on the display device 20, so that an image subjected to image processing is redrawn and displayed on the display device 20. In this case, the user is able to perform image processing interactively while viewing the display device 20, thereby making it possible to proceed with an image processing operation more intuitively and more easily.

The image processing system 1 in an exemplary embodiment of the invention is not restricted to the configuration shown in FIG. 1. For example, a tablet terminal may be used as the image processing system 1. In this case, a tablet terminal includes a touch panel, and an image is displayed on this touch panel and a user inputs an instruction by using this touch panel. That is, the touch panel serves as the display device 20 and the input device 30. Similarly, a touch monitor may be used as a device integrating the display device 20 and the input device 30. In the touch monitor, a touch panel is used as the display screen 21 of the display device 20. In this case, the image processing apparatus 10 generates image information, and, on the basis of this image information, an image is displayed on the touch monitor. The user then inputs an instruction concerning image processing to be performed by touching the touch monitor.

Description of Image Processing Apparatus

First Exemplary Embodiment

A first exemplary embodiment of the image processing apparatus 10 will be described below.

Figure 2:
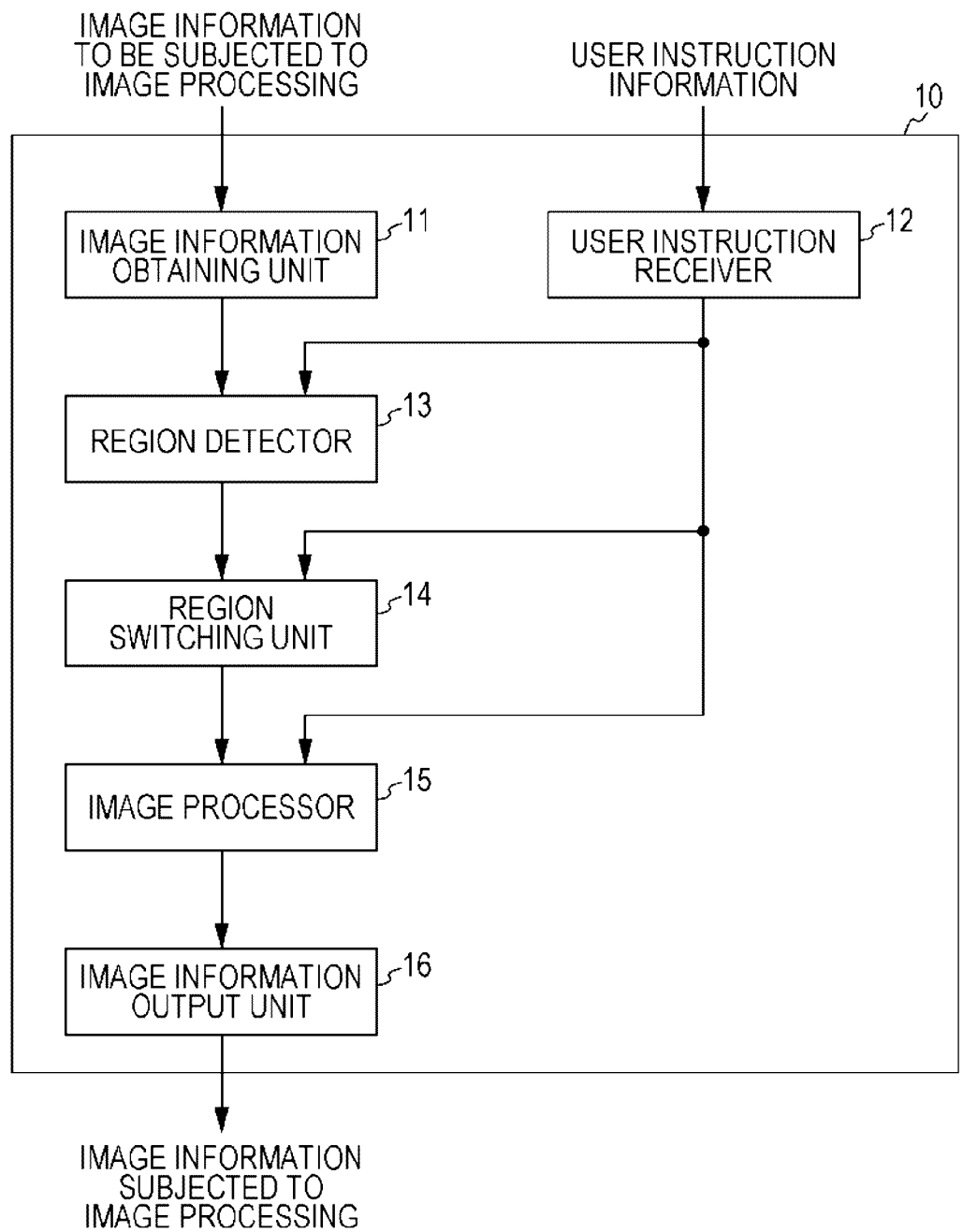
FIG. 2 is a block diagram illustrating an example of the functional configuration of an image processing apparatus according to a first exemplary embodiment of the invention.

FIG. 2 is a block diagram illustrating an example of the functional configuration of the image processing apparatus 10 according to the first exemplary embodiment of the invention. Among various functions of the image processing apparatus 10, functions related to the first exemplary embodiment are selected and shown in FIG. 2.

The image processing apparatus 10 of the first exemplary embodiment includes, as shown in FIG. 2, an image information obtaining unit 11, a user instruction receiver 12, a region detector 13, a region switching unit 14, an image processor 15, and an image information output unit 16.

The image information obtaining unit 11 obtains image information indicating a first image to be subjected to image processing. That is, the image information obtaining unit 11 obtains image information that has not been subjected to image processing. This image information is, for example, red, green, and blue video data (RGB data) for displaying an image on the display device 20.

The user instruction receiver 12, which is an example of a position information obtaining unit, receives an instruction concerning image processing input by a user through the input device 30.

More specifically, the user instruction receiver 12 receives, as user instruction information, an instruction concerning image regions specified by the user from an image displayed on the display device 20 as image regions to be subjected to image processing. The user instruction receiver 12 also receives, as user instruction information, an instruction concerning a specified image region selected by the user from among the specified image regions as an image region to be subjected to image processing. The user instruction receiver 12 also receives, as user instruction information, an instruction concerning an element and an amount of image processing to be performed on this specified region and determined by the user. A detailed description of the user instruction information will be given later.

The region detector 13 detects, from the first image displayed on the display device 20, a specified region which has been specified by a user as an image region to be subjected to image processing, on the basis of an instruction from the user received by the user instruction receiver 12. In practice, the region detector 13 performs image segmentation to cut a specified region from the first image displayed on the display device 20.

In this exemplary embodiment, a specified region is cut by a user interactive approach, which will be discussed below.

Figure 3:
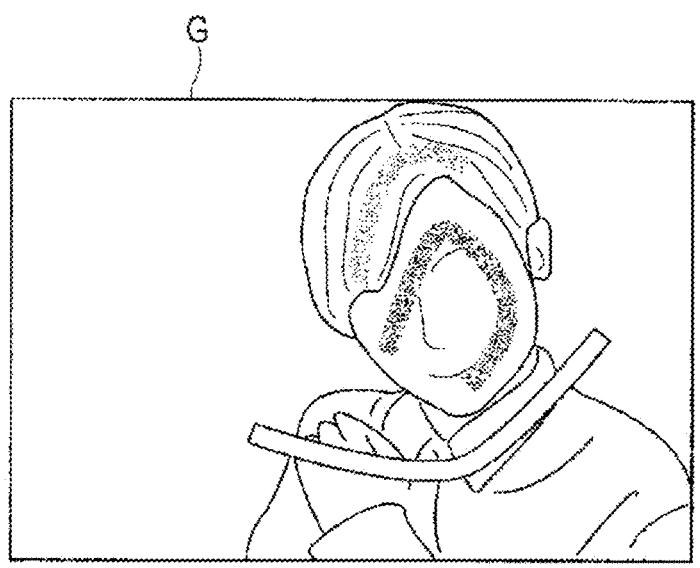
FIG. 3 illustrates an example of an approach to selecting specified regions user-interactively.

FIG. 3 illustrates an example of an approach to selecting specified regions user-interactively.

In the example in FIG. 3, the image displayed on the display screen 21 of the display device 20 is a photo image G constituted by a person shown as a foreground and a background shown behind the person, and a user selects a hair portion, a face portion, and a portion other than the hair portion and the face portion of the person as the foreground as specified regions. That is, in this case, there are three specified regions. Hereinafter, the specified region of the hair portion may be referred to as a "first specified region", the specified region of the face portion may be referred to as a "second specified region", and the specified region of the portion other than the hair portion and the face portion may be referred to as a "third specified region".

Then, the user provides a path of the hair portion, a path of the face portion, and a path of the portion other than the hair portion and the face portion, as representatives thereof. The user may input these paths by using the input device 30. More specifically, if the input device 30 is a mouse, the user draws paths by operating the mouse to drag the image G shown in FIG. 3 on the display screen 21 of the display device 20. If the input device 30 is a touch panel, the user draws paths by moving a finger or a touch pen on the image G to swipe the display screen 21. Instead of paths, dots may be provided. That is, representatives of the hair portion, the face portion, and the portion other than the hair portion and the face portion may be indicated in any manner as long as information indicating positions thereof is provided. This may also be described such that a user inputs position information (first position information) indicating representative positions of the specified regions. Hereinafter, such paths or dots may be referred to as "seeds".

Then, this position information (first position information) is obtained by the user instruction receiver 12 as user instruction information, and then, the region detector 13 cuts the specified regions.

In order to cut the specified regions on the basis of information concerning seeds, the region detector 13 first adds flags to pixels forming the regions in which the seeds are provided. In the example shown in FIG. 3, the region detector 13 adds a flag "1" to the pixels corresponding to the path drawn on the hair portion, a flag "2" to the pixels corresponding to the path drawn on the face portion, and a flag "3" to the pixels corresponding to the path drawn on the portion other than the hair portion and the face portion.

Then, on the basis of the proximity (for example, Euclidean distance of RGB values) between the pixels forming a path and peripheral pixels, pixels having a high proximity are interconnected to each other, and pixels which do not have a high proximity are not interconnected. By repeating this operation, a region grows from the pixels forming a path.

Figure 4A:
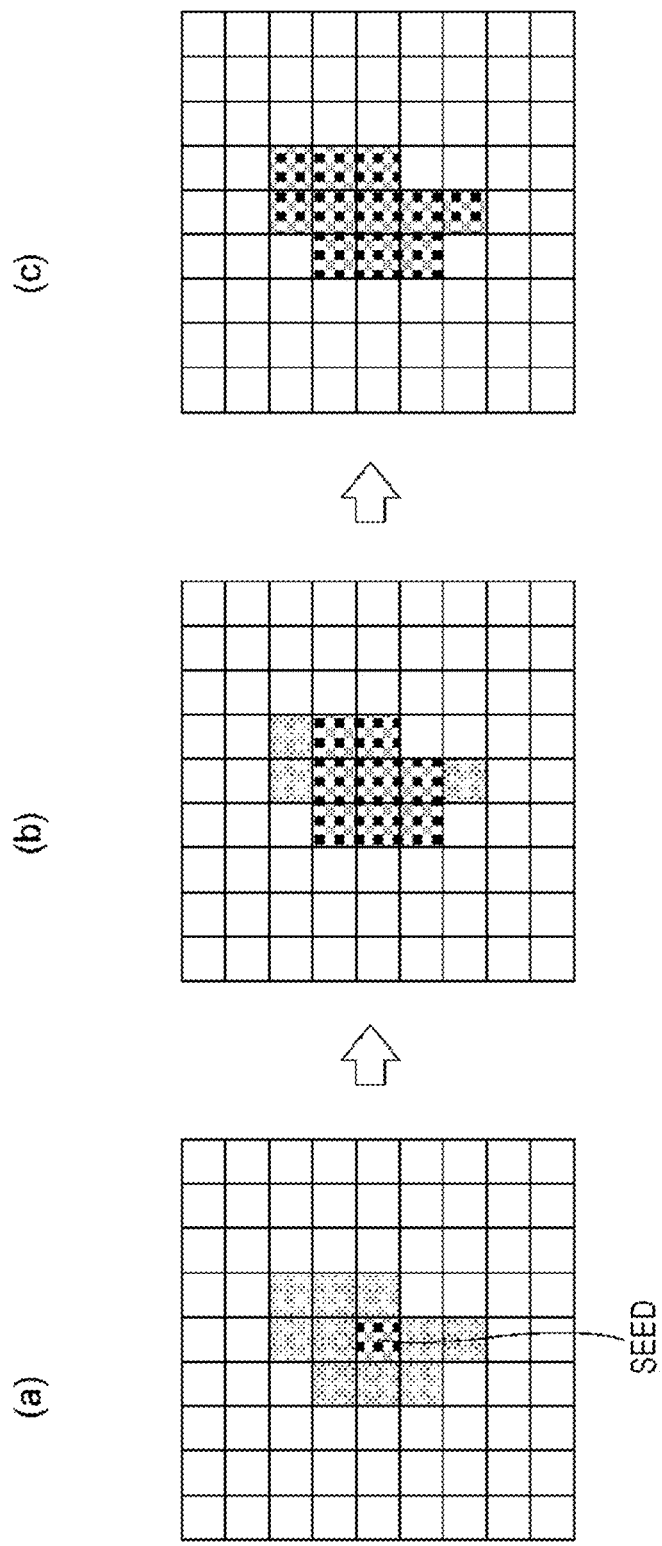
FIG. 4A illustrates a state in which a region grows from a pixel forming a seed drawn by a user.

FIG. 4A illustrates a state in which a region grows from a pixel forming a seed drawn by a user.

As shown in FIG. 4A, a region gradually grows from a pixel provided as a seed positioned at the center of the image toward peripheral pixels, as indicated by parts (a)→(b)→(c) of FIG. 4A. The same flag as that added to the pixel provided as the seed is added to pixels of a portion grown from this pixel.

An image may be divided into plural regions on the basis of the concept of the above-described region growing technique.

Figure 4B:
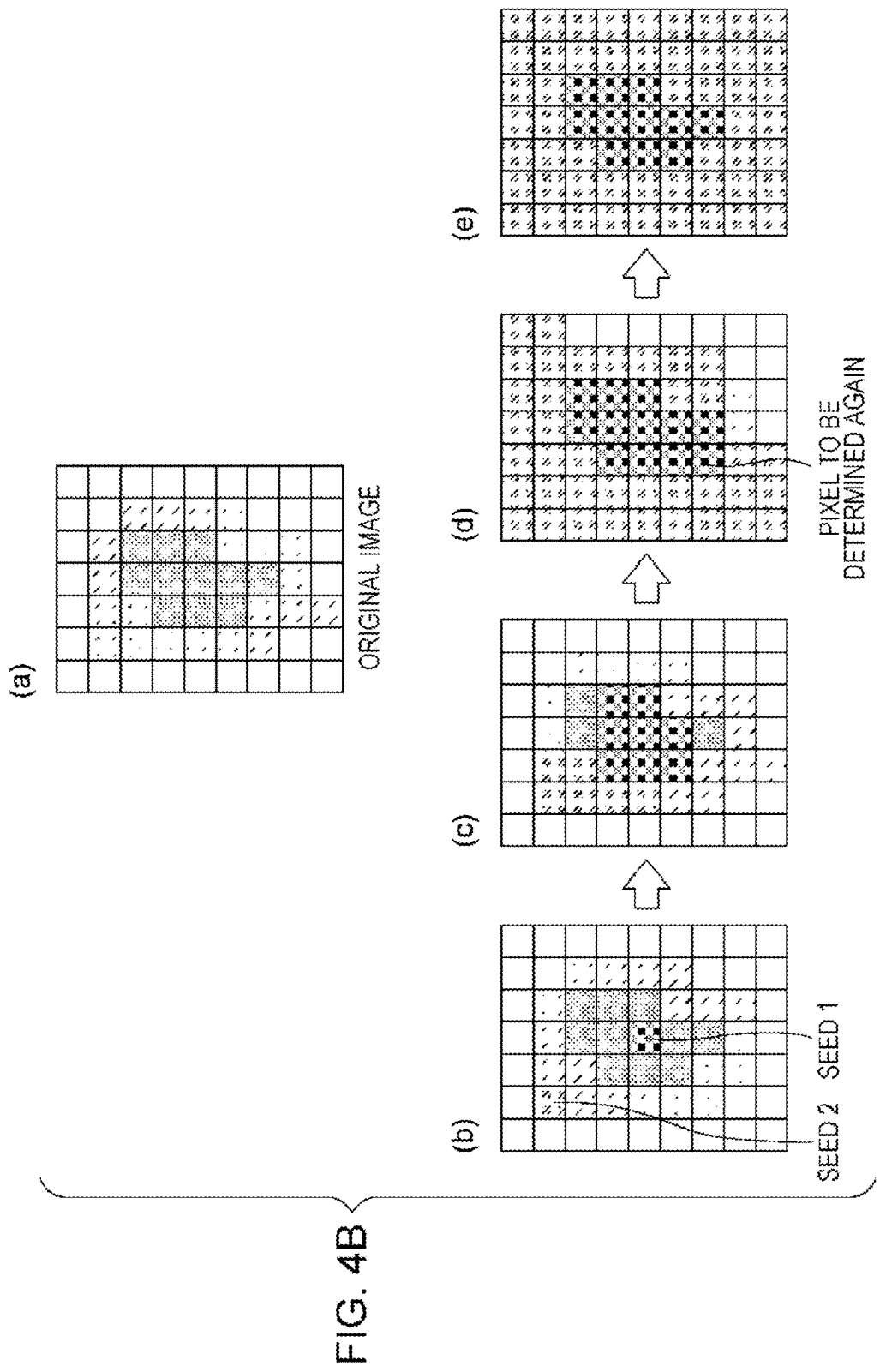
FIG. 4B illustrates a specific example in which an image is segmented into two regions when two seeds are provided.

FIG. 4B illustrates a specific example in which an image is divided into two regions when two seeds are provided.

In this example, a seed 1 and a seed 2 are provided, as indicated by part (b) of FIG. 4B, to an original image shown in part (a) of FIG. 4B. Then, the two regions grow on the basis of the seed 1 and the seed 2 as base points. In this case, each region may grow according to the proximity of pixel values of adjacent pixels in the original image. If there is a conflict between the two regions, as indicated by part (c) of FIG. 4B, an undetermined pixel may be determined again concerning to which region the pixel belongs, on the basis of the relationship between the pixel value of the subject pixel and that of an adjacent pixel. In this case, the technique disclosed in the following document may be employed.

V. Vezhnevets and V. Konouchine: "Grow-Cut"-Interactive Multi-label N-D Image Segmentation By Cellular Automata", Proc. Graphicon. pp 150-156 (2005)

As indicated by part (d) of FIG. 4B, the subject pixel is ultimately determined to be the region of the seed 2. The original image is segmented into two regions on the basis of the two seeds, as indicated by part (e) of FIG. 4B.

The specified regions may be cut by the region growing technique.

FIGS. 5A through 5C illustrate a state in which specified regions are cut from the image G shown in FIG. 3 by using the region growing technique.

FIG. 5A illustrates a state in which paths are drawn as seeds within the image G shown in FIG. 3.

Then, as shown in FIG. 5B, regions grow from the paths drawn as seeds toward specified regions, and as shown in FIG. 5C, ultimately, a first specified region (S1), a second specified region (S2), and a third specified region (S3), which are three specified regions, are cut.

By employing such a technique, a user is able to cut specified regions more easily and more intuitively even if specified regions have complicated shapes.

In this example, when the position of a pixel is indicated by (x, y), it is possible to express to which specified region this pixel belongs by using equation (1). In equation (1), l(x, y) denotes the value of a flag added to a pixel located at a position (x, y). That is, since a flag "1", "2", or "3" is added to a pixel within a specified region, it is possible to identify to which specified region this pixel belongs by the value of the flag.

$$l(x,y)=1 \text{ or } 2 \text{ or } 3 \tag{1}$$

By employing the region growing technique, it is possible to cut even three or more specified regions.

If there are two specified regions to be cut, a technique for utilizing the max-flow min-cut theorem by assuming an image as a graph may be employed.

Figure 6:
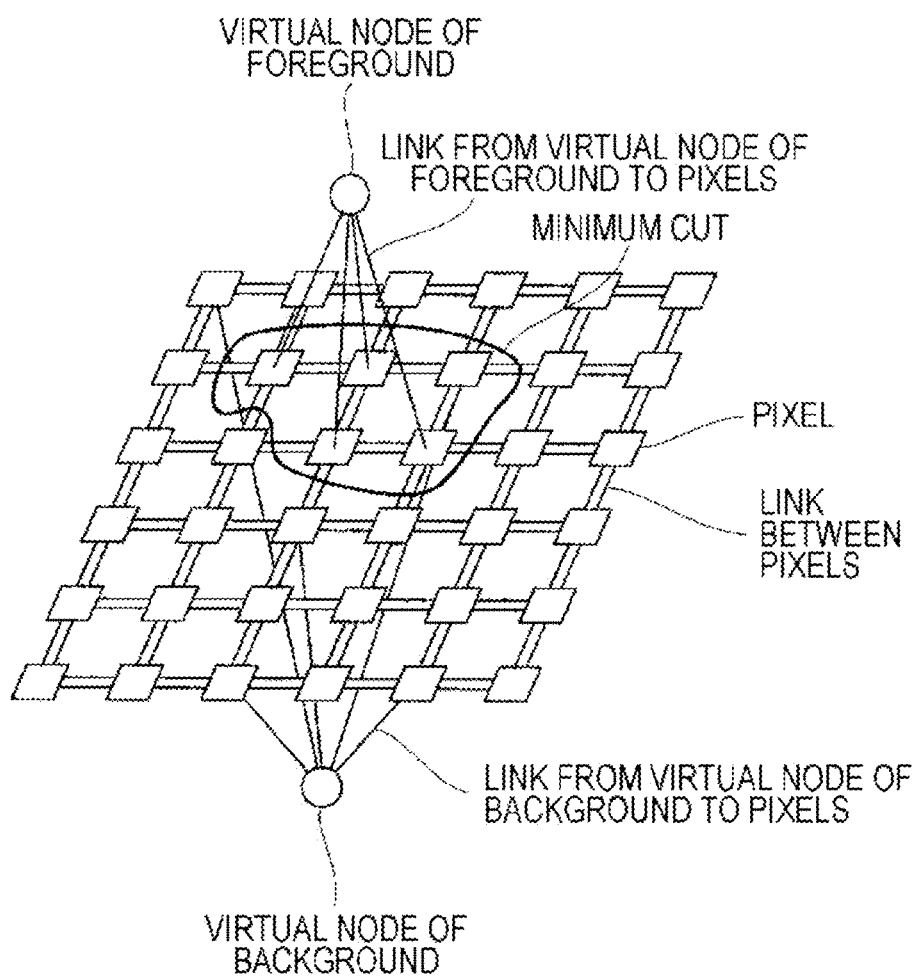
FIG. 6 illustrates the max-flow min-cut theorem.

This theorem is as follows. As shown in FIG. 6, a virtual node of a foreground is set as a start point (source), and a virtual node of a background is set as an end point (sink). Then, the start point is linked to representative positions of a foreground region specified by a user, and representative positions of a background region specified by the user are linked to the end point. Then, assuming that water flows from the start point, the maximum amount of water flowing from the start point to the end point is calculated. Assuming that the value of a link from the foreground to the start point indicates a thickness of a water pipe, the total value of a cut constituted by portions causing a bottleneck (water is difficult to flow) is the maximum amount of water. That is, by cutting the links causing a bottleneck, the foreground and the background can be separated (graph cut).

The above-described examples refer to segmentation of image regions, and specific examples of the technique for cutting an image region by utilizing the region growing technique and a graph have been discussed. In this exemplary embodiment, however, the technique for cutting an image region is not particularly restricted, and any technique may be applicable.

With the use of the approach to cutting specified regions user-interactively, the precision in cutting specified regions is enhanced.

Referring back to FIG. 2, the region switching unit 14 switches between plural specified regions. That is, if there are plural specified regions, a user selects a specified region that the user wishes to perform image adjustment, and the region switching unit 14 switches between the specified regions in accordance with the selection made by the user.

Figure 7A:
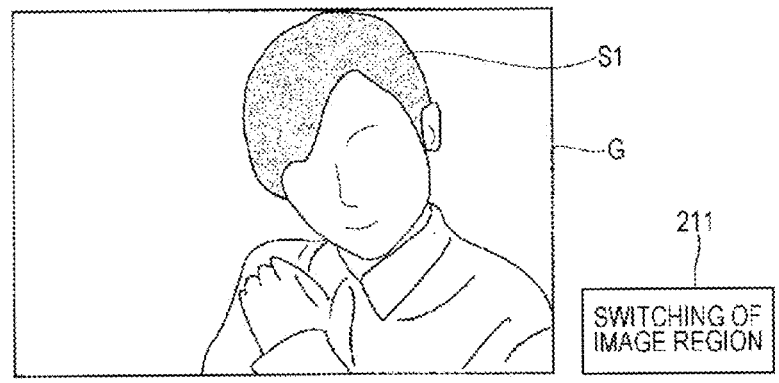
FIGS. 7A through 7C illustrate a first example of frames displayed on a display screen of a display device when selecting a specified region by a user.
Figure 7B:
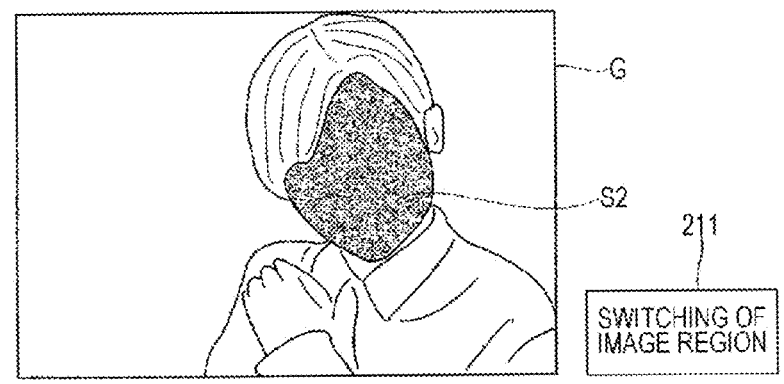
Figure 7C:

FIGS. 7A through 7C illustrate a first example of frames displayed on the display screen 21 of the display device 20 when selecting a specified region by a user.

In the example shown in FIGS. 7A through 7C, the image G with a specified region selected by a user is displayed on the left side of the display screen 21, and an image switching button 211 is displayed on the right side of the display screen 21. When the user operates the image switching button 211 by using the input device 30, the specified region is switched. More specifically, if the input device 30 is a mouse, the user operates the mouse to adjust a cursor to the image switching button 211 and clicks the mouse. If the input device 30 is a touch panel, the user taps the image switching button 211 by using a finger or a touch pen.

In FIG. 7A, the first specified region (S1), which is the image region of the hair portion, is being selected. Then, as stated above, when the user operates the image switching button 211, the specified region is switched to the second specified region (S2), which is the image region of the face portion, as shown in FIG. 7B. When the user further operates the image switching button 211, the specified region is switched to the third specified region (S3), which is the image region of the portion other than the hair portion and the face portion, as shown in FIG. 7C. When the user further operates the image switching button 211, the specified region is switched to the first specified region (S1), and the image G returns to the state shown in FIG. 7A.

Figure 8A:
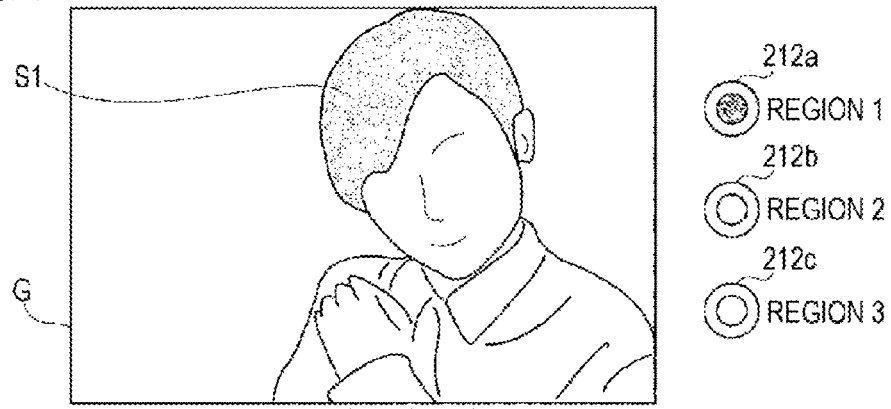
FIGS. 8A through 8C illustrate a second example of frames displayed on a display screen of a display device when selecting a specified region by a user.
Figure 8B:
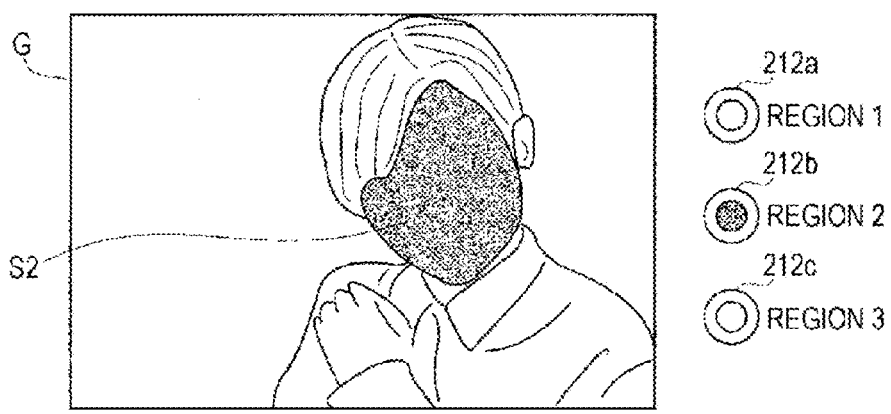
Figure 8C:
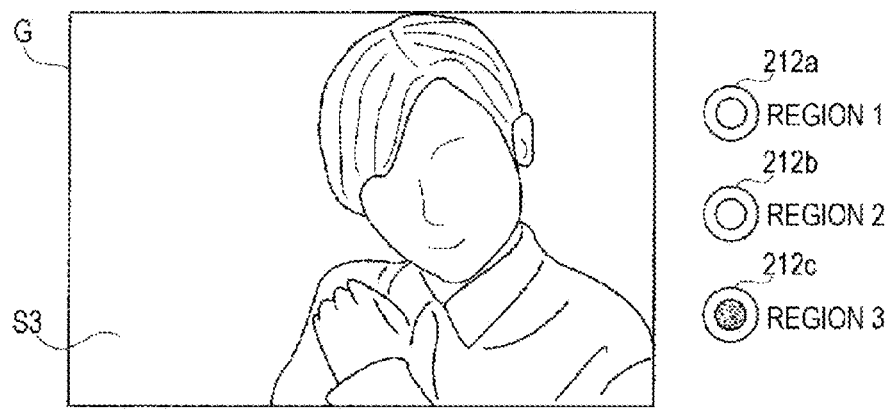

FIGS. 8A through 8C illustrate a second example of frames displayed on the display screen 21 of the display device 20 when selecting a specified region by a user.

In the example shown in FIGS. 8A through 8C, an image G with a specified region selected by the user is displayed at the left side of the display screen 21, and on the right side of the display screen 21, radio buttons 212a, 212b, and 212c for selecting a region 1, a region 2, and a region 3, respectively, are displayed. In this case, the region 1, the region 2, and the region 3 correspond to the first specified region (S1), the second specified region (S2), and the third specified region (S3), respectively. Then, when the user sequentially selects the radio buttons 212a, 212b, and 212c by using the input device 30, the specified region is switched among the region 1, the region 2, and the region 3.

FIG. 8A illustrates a state in which the radio button 212a is being selected, and thus, the first specified region (S1), which is the image region of the hair portion, is being selected. Then, when the user selects the radio button 212b, the specified region is switched to the second specified region (S2), which is the image region of the face portion, as shown in FIG. 8B. Then, when the user further selects the radio button 212c, the specified region is switched to the third specified region (S3), which is the image region of the portion other than the hair portion and the face portion, as shown in FIG. 8C.

In practice, the results of performing the operations discussed with reference to FIGS. 7A through 8C are obtained by the user instruction receiver 12 as user instruction information, and the region switching unit 14 switches between the specified regions.

The image processor 15 performs image processing on a specified region selected by the user.

Figure 9:
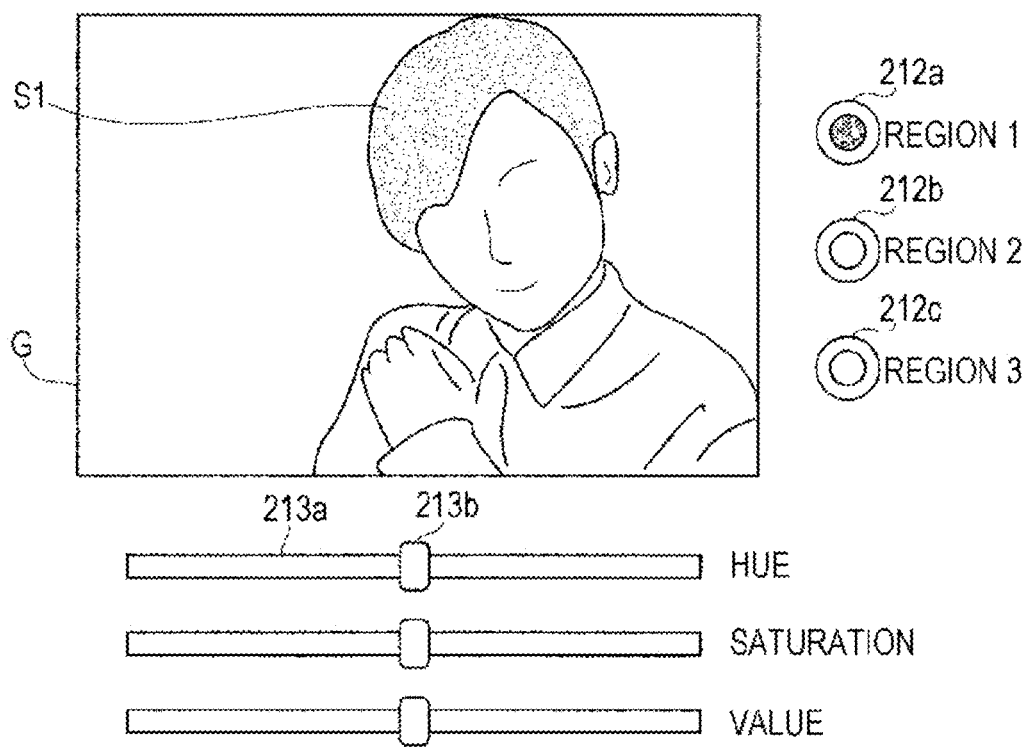
FIG. 9 illustrates an example of a frame displayed on a display screen of a display device when image processing is performed.

FIG. 9 illustrates an example of a frame displayed on the display screen 21 of the display device 20 when the image processor 15 performs image processing.

In this case, an example in which the hue, saturation, and value of a selected specified region are adjusted is shown. In the example shown in FIG. 9, an image G with a specified region selected by a user is displayed at the top left side of the display screen 21, and on the top right side of the display screen 21, radio buttons 212a, 212b, and 212c for selecting a region 1, a region 2, and a region 3, respectively, are displayed. In FIG. 9, the radio button 212a is being selected, and thus, the first specified region (S1), which is the image region of the hair portion, is being selected. As in the radio buttons 212a, 212b, 212c shown in FIGS. 8A through 8C, the specified region may be switched by operating the radio buttons 212a, 212b, and 212c.

At the bottom of the display screen 21, slide bars 213a for adjusting the hue, saturation, and value and sliders 213b are shown. The sliders 213b are slidable on the slide bars 213a to the right and left sides in FIG. 9 as a result of a user operating the input device 30. In the initial state, the sliders 213b are positioned at the center of the slide bars 213a, and the states of the hue, saturation, and value that have not been adjusted are indicated.

Then, when the user slides one of the sliders 213b corresponding to the hue, saturation, and value on the associated slide bar 213a to the right and left sides in FIG. 9 by using the input device 30, image processing is performed on the selected specified region, and the image G displayed on the display screen 21 is changed accordingly. In this case, if the user slides the slider 213b to the right side in FIG. 9, image processing is performed so that the corresponding element among the hue, saturation, and value is increased. In contrast, if the user slides the slider 213b to the left side in FIG. 9, image processing is performed so that the corresponding element among the hue, saturation, and value is decreased.

In this case, a flag may be added to pixels forming the specified regions. For example, a flag "1" may be added to pixels forming a selected specified region, and a flag "0" may be added to pixels forming the specified regions other than the selected specified region.

In this case, when the position of a pixel is indicated by (x, y), a determination as to whether or not this pixel is included in the selected specified region may be made by using equation (2). In equation (2), L(x, y) denotes the value of a flag added to a pixel located at a position (x, y). That is, since a flag "0" or "1" is added to a pixel within the specified regions, it is possible to determine whether or not this pixel is included in the selected specified region by the value of the flag.

$$L(x,y)=0 \text{ or } 1 \qquad (2)$$

Figure 10A:
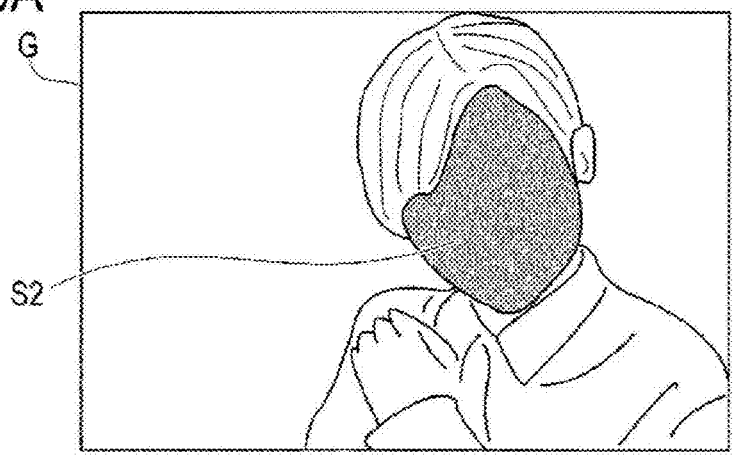
FIG. 10A illustrates a state in which a second specified region, which is the image region of a face portion, is being selected as a specified region.

FIG. 10A illustrates a state in which the second specified region (S2), which is the image region of the face portion, is being selected.

Figure 10B:
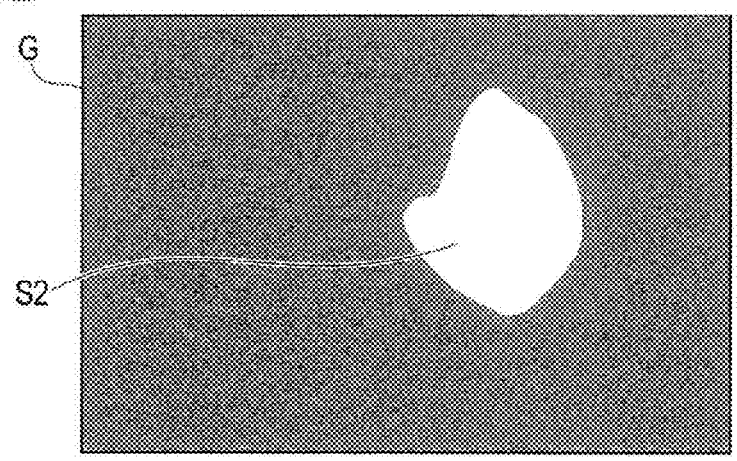
FIG. 10B illustrates the distribution of the values of flags L(x, y) added to the image shown in FIG. 10A.

FIG. 10B illustrates the distribution of the values of flags L(x, y). A white portion is a portion to which the flag "1" is added. A black portion is a portion to which the flag "0" is added and indicates the portion other than the selected specified region. The image shown in FIG. 10B may also be regarded as a mask for segmenting the image G into the selected specified region and the portion other than the selected specified region. In this case, image processing is performed only on pixels to which the flag represented by L(x, y) "1" is added.

Alternatively, a mask $L_G(x, y)$ expressed by the following equation (3) may be considered.

$$L_G(x,y)=G(x,y)\otimes L(x,y) \qquad (3)$$

Equation (3) expresses that L(x, y) is convoluted by G(x, y). G(x, y) denotes a Gaussian function expressed by equation (4). In equation (4), σ is a parameter representing the degree of blurring.

$$G(x, y) = \frac{1}{2\pi\sigma^2}e^{-\frac{x^2+y^2}{2\sigma^2}} \qquad (4)$$

Figure 10C:
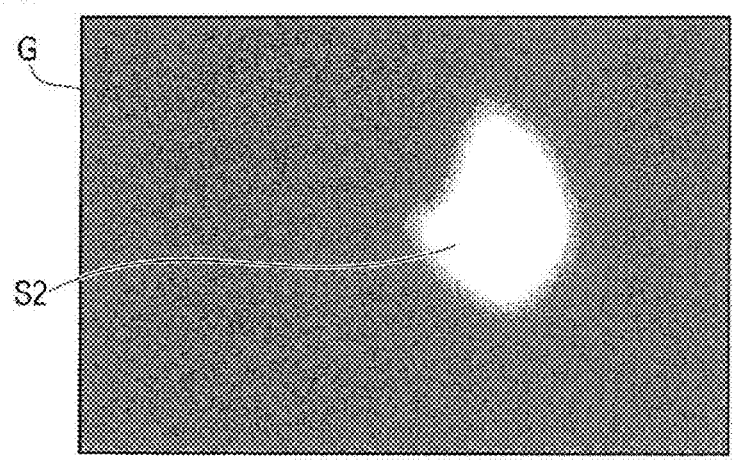
FIG. 10C illustrates a mask.

FIG. 10C illustrates a mask obtained by the above-described processing.

The mask shown in FIG. 10C is different from that shown in FIG. 10B in that, instead of fixing the selected specified region to the value 1 and the portion other than the selected specified region to the value 0, the value in a range from 0 to 1 is added to both of the selected specified region and the portion other than the selected specified region. The value of a mask is normally 1 in a selected specified region and 0 in the portion other than the selected specified region. In this case, however, the value from 0 to 1 is added to an area around the boundary between the selected specified region and the portion other than the selected specified region. That is, the mask shown in FIG. 10C is a smoothing mask that makes the boundary between the selected specified region and the portion other than the selected specified region blur. Although in this example a smoothing mask is generated by using a Gaussian function, the moving average method may be used.

By using $L_G(x, y)$ in equation (3), the boundary between the selected specified region and the portion other than the selected specified region is smoothed, thereby making it possible to blur an area around the boundary therebetween. With this operation, a step difference at the boundary between the selected specified region and the portion other than the selected specified region is reduced, and the resulting image looks more natural.

When performing image adjustment concerning the hue, saturation, and value, as shown in FIG. 9, it is preferable that image information which has not been subjected to image processing (for example, RGB data) is converted into HSV data indicating the values of hue (H), saturation (S), and value (V). However, color data into which the image information is converted is not restricted to HSV data, and any color data may be used as long as the hue, saturation, and value may be determined. For example, color data in a luminance-chrominance space, such as L*a*b* data representing L*a*b* values or YCbCr data representing Y, Cb, and Cr values, may be used.

In this case, if HSV data indicating the hue, saturation, and value which have not been adjusted is represented by H(x, y), S(x, y), and V(x, y), and if HSV data indicating the hue, saturation, and value which have been adjusted is represented by H'(x, y), S'(x, y), and V'(x, y), this image processing may be represented by expressions (5).

$$H(x,y) \rightarrow H'(x,y)$$

$$S(x,y) \rightarrow S'(x,y)$$

$$V(x,y) \rightarrow V'(x,y) \qquad (5)$$

If average values of the hue, saturation, and value in the selected specified region which have not been adjusted are represented by Have, Save, Vave, respectively, Have, Save, Vave may be expressed by equations (6). In equations (6), N is the number of pixels within the selected specified region and D is the selected specified region.

$$Have = \frac{1}{N} \sum_D H(x, y) \quad (6)$$

$$Save = \frac{1}{N} \sum_D S(x, y)$$

$$Vave = \frac{1}{N} \sum_D V(x, y)$$

When the mask expressed by equation (3) and shown in FIG. 10C is used, Have, Save, Vave are expressed by equations (7).

$$Have = \frac{1}{\sum_D L_G(x, y)} \sum_D H(x, y) \quad (7)$$

$$Save = \frac{1}{\sum_D L_G(x, y)} \sum_D S(x, y)$$

$$Vave = \frac{1}{\sum_D L_G(x, y)} \sum_D V(x, y)$$

When the sliders 213b concerning the hue, saturation, and value shown in FIG. 9 are slid, Have, Save, Vave described above are changed to a maximum level. This will be discussed below.

Figure 11B:
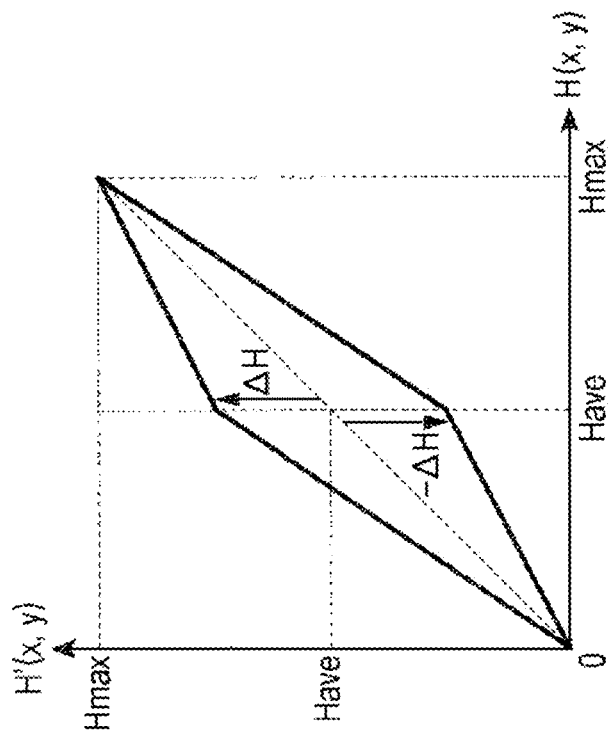
FIG. 11B illustrates an example of a tone curve used for adjusting the hue.
Figure 11A:
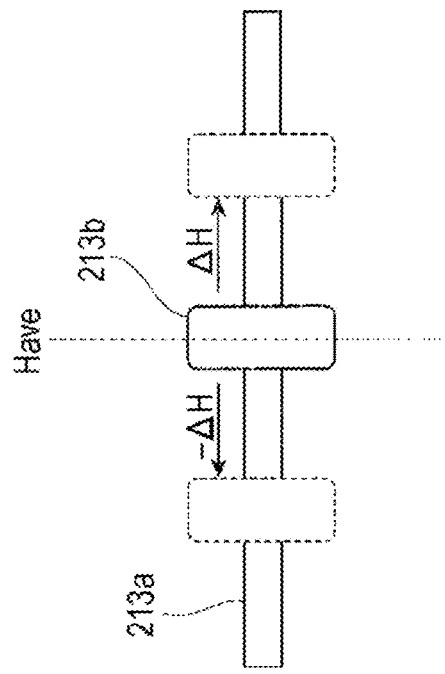
FIG. 11A illustrates a state in which a slider concerning the hue shown in FIG. 9 is slid.

FIG. 11A illustrates a state in which the slider 213b concerning the hue (H) shown in FIG. 9 is slid.

When the user slides the slider 213b to the right side in FIG. 11A from the central position, the hue (H) is increased, as stated above. In contrast, when the user slides the slider 213b to the left side in FIG. 11A from the central position, the hue (H) is decreased. The amount by which the hue (H) is increased is indicated by ΔH in FIG. 11A. The amount by which the hue (H) is decreased is indicated by −ΔH in FIG. 11A.

FIG. 11B illustrates an example of a tone curve used for adjusting the hue (H). The horizontal axis indicates the hue H(x, y) that has not been adjusted, and the vertical axis indicates the hue H'(x, y) that has been adjusted.

In FIG. 11B, ΔH indicates an amount by which the hue (H) is increased from the average hue value Have, and −ΔH indicates an amount by which the hue (H) is decreased from the average hue value Have.

That is, when the hue (H) is increased by ΔH, the average hue value Have increases by ΔH, and thus, the adjusted hue (H) is expressed by Have+ΔH. The tone curve of the hue H'(x, y) is indicated by the upper thick lines in FIG. 11B constituted by a line connecting the position at Have+ΔH and the minimum value 0 of the hue (H) and a line connecting the position at Have+ΔH and the maximum value Hmax of the hue (H).

On the other hand, when the hue (H) is decreased by ΔH, the average hue value Have decreases by ΔH, and thus, the adjusted hue (H) is expressed by Have−ΔH. The tone curve of the hue H'(x, y) is indicated by the lower thick lines in FIG. 11B constituted by a line connecting the position at Have−ΔH and the minimum value 0 of the hue (H) and a line connecting the position at Have−ΔH and the maximum value Hmax of the hue (H).

Figure 12B:
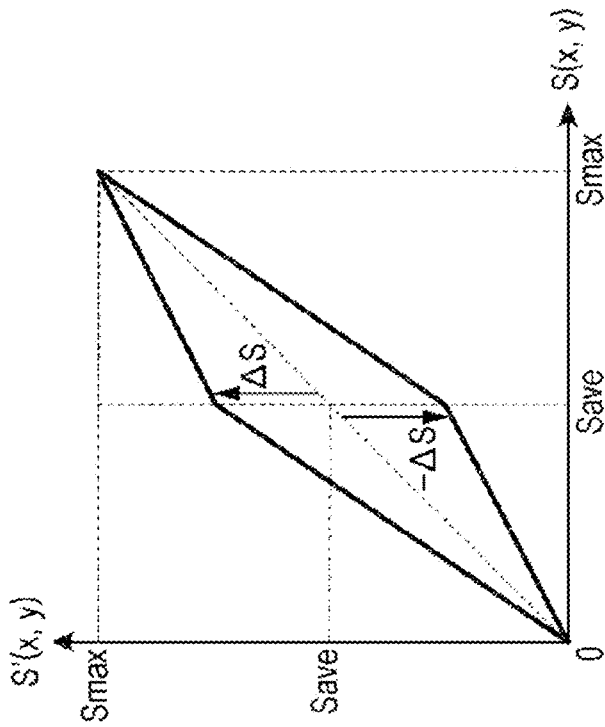
FIG. 12B illustrates an example of a tone curve used for adjusting the saturation.
Figure 12A:
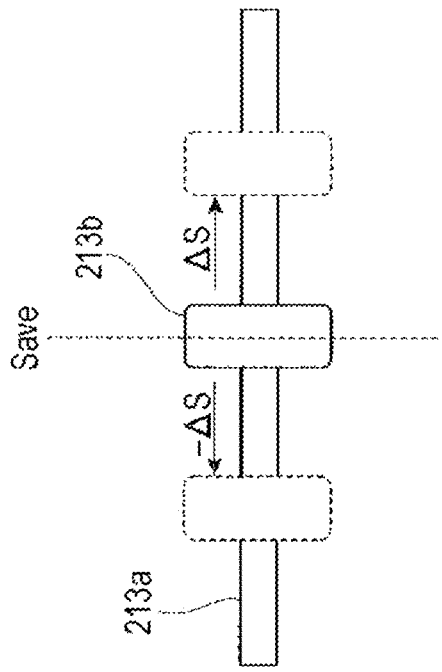
FIG. 12A illustrates a state in which a slider concerning the saturation shown in FIG. 9 is slid.

FIG. 12A illustrates a state in which the slider 213b concerning the saturation (S) shown in FIG. 9 is slid.

When the user slides the slider 213b to the right side in FIG. 12A from the central position, the saturation (S) is increased, as stated above. In contrast, when the user slides the slider 213b to the left side in FIG. 12A from the central position, the saturation (S) is decreased. The amount by which the saturation (S) is increased is indicated by ΔS in FIG. 12A. The amount by which the saturation (S) is decreased is indicated by −ΔS in FIG. 12A.

FIG. 12B illustrates an example of a tone curve used for adjusting the saturation (S). The horizontal axis indicates the saturation S(x, y) that has not been adjusted, and the vertical axis indicates the saturation S'(x, y) that has been adjusted.

In FIG. 12B, ΔS indicates an amount by which the saturation (S) is increased from the average saturation value Save, and −ΔS indicates an amount by which the saturation (S) is decreased from the average saturation value Save.

When the saturation (S) is increased by ΔS, the average saturation value Save increases by ΔS, and thus, the adjusted saturation (S) is expressed by Save+ΔS. The tone curve of the saturation S'(x, y) is indicated by the upper thick lines in FIG. 12B constituted by a line connecting the position at Save+ΔS and the minimum value 0 of the saturation (S) and a line connecting the position at Save+ΔS and the maximum value Smax of the saturation (S).

On the other hand, when the saturation (S) is decreased by ΔS, the average saturation value Save decreases by ΔS, and thus, the adjusted saturation (S) is expressed by Save−ΔS. The tone curve of the saturation S'(x, y) is indicated by the lower thick lines in FIG. 12B constituted by a line connecting the position at Save−ΔS and the minimum value 0 of the saturation (S) and a line connecting the position at Save−ΔS and the maximum value Smax of the saturation (S).

Figure 13A:
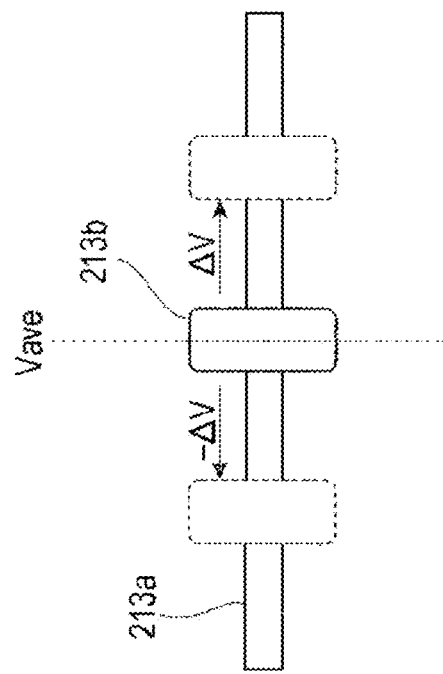
FIG. 13A illustrates a state in which a slider concerning the value shown in FIG. 9 is slid.

FIG. 13A illustrates a state in which the slider 213b concerning the value (V) shown in FIG. 9 is slid.

When the user slides the slider 213b to the right side in FIG. 13A from the central position, the value (V) is increased, as stated above. In contrast, when the user slides the slider 213b to the left side in FIG. 13A from the central position, the value (V) is decreased. The amount by which the value (V) is increased is indicated by ΔV in FIG. 13A. The amount by which the value (V) is decreased is indicated by −ΔV in FIG. 13A.

Figure 13B:
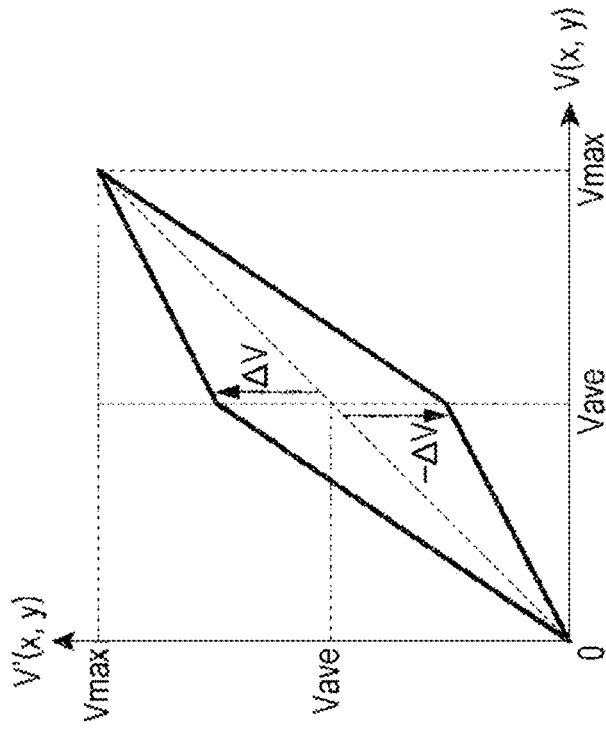
FIG. 13B illustrates an example of a tone curve used for adjusting the value.

FIG. 13B illustrates an example of a tone curve used for adjusting the value (V). The horizontal axis indicates the value V(x, y) that has not been adjusted, and the vertical axis indicates the value V'(x, y) that has been adjusted.

In FIG. 13B, ΔV indicates an amount by which the value (V) is increased from the average value Vave, and −ΔV indicates an amount by which the value (V) is decreased from the average value Vave.

When the value (V) is increased by ΔV, the average value Vave increases by ΔV, and thus, the adjusted value (V) is expressed by Vave+ΔV. The tone curve of the value V'(x, y) is indicated by the upper thick lines in FIG. 13B constituted by a line connecting the position at Vave+ΔV and the minimum value 0 of the value (V) and a line connecting the position at Vave+ΔV and the maximum value Vmax of the value (V).

On the other hand, when the value (V) is decreased by ΔV, the average value Vave decreases by ΔV, and thus, the adjusted value (V) is expressed by Vave−ΔV. The tone curve of the value V'(x, y) is indicated by the lower thick lines in FIG. 13B constituted by a line connecting the position at Vave−ΔV and the minimum value 0 of the value (V) and a line connecting the position at Vave−ΔV and the maximum value Vmax of the value (V).

If equations (7) are applied to expressions (5) for calculating adjusted HSV data, expressions (5) are modified into equations (8). In equations (8), $f_H(H(x, y))$ is a function representing the tone curve shown in FIG. 11B, $f_S(S(x, y))$ is a function representing the tone curve shown in FIG. 12B, and $f_V(V(x, y))$ is a function representing the tone curve shown in FIG. 13B.

$$H'(x,y)=L_G(x,y)f_H(H(x,y))+(1-L_G(x,y))H(x,y)$$

$$S'(x,y)=L_G(x,y)f_S(S(x,y))+(1-L_G(x,y))S(x,y)$$

$$V'(x,y)=L_G(x,y)f_V(V(x,y))+(1-L_G(x,y))V(x,y) \quad (8)$$

In the above-described examples, when selecting a specified region, the image switching button 211 or the radio buttons 212a, 212b, and 212c are used, and when adjusting the hue, saturation, and value of a selected specified region, the sliders 213b are used. However, the selection and adjustment of a specified region is not restricted to the use of the above-described buttons and sliders, which will be discussed below.

Figure 14:
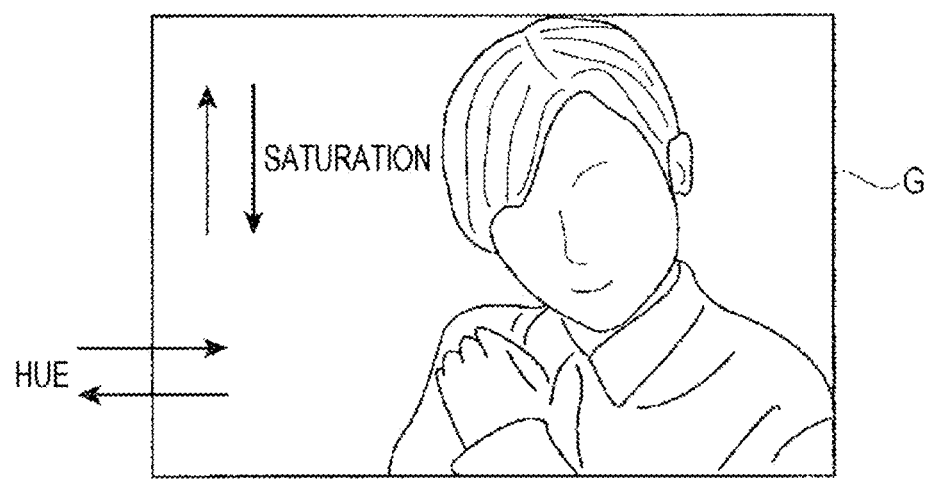
FIG. 14 illustrates an example of a frame displayed on a display screen when performing adjustment of the hue and the saturation.

FIG. 14 illustrates an example of a frame displayed on the display screen 21 when adjustment of the hue (H) and the saturation (S) is performed.

In the example shown in FIG. 14, a user adjusts the hue (H) and the saturation (S) after selecting a specified region. In this case, the user operates the input device 30 and moves a cursor displayed on the display screen 21 vertically and horizontally to perform a drag operation. If the display screen 21 is a touch panel, the user moves a finger or a touch pen vertically and horizontally to swipe the display screen 21.

When the user performs a drag operation or a swipe operation horizontally, the hue (H) is adjusted. That is, when the user performs a drag operation or a swipe operation in the right direction, the hue (H) of a selected specified region is increased. When the user performs a drag operation or a swipe operation in the left direction, the hue (H) of a selected specified region is decreased.

When the user performs a drag operation or a swipe operation vertically, the saturation (S) is adjusted. That is, when the user performs a drag operation or a swipe operation in the upward direction, the saturation (S) of a selected specified region is increased. When the user performs a drag operation or a swipe operation in the downward direction, the saturation (S) of a selected specified region is decreased.

In this exemplary embodiment, the amount by which the hue or the saturation will be adjusted is changed by a distance by which a finger or a touch pen is moved or the number of times a finger or a touch pen is moved. That is, as the distance by which a finger or a touch pen is moved or the number of times a finger or a touch pen is moved is greater, the hue or the saturation may be increased or decreased to a greater level. The amount by which the hue or the saturation will be adjusted is changed in this manner corresponds to a change of the amount of ΔH and −ΔH shown in FIG. 11B or ΔS and −ΔS shown in FIG. 12B.

Figure 15A:
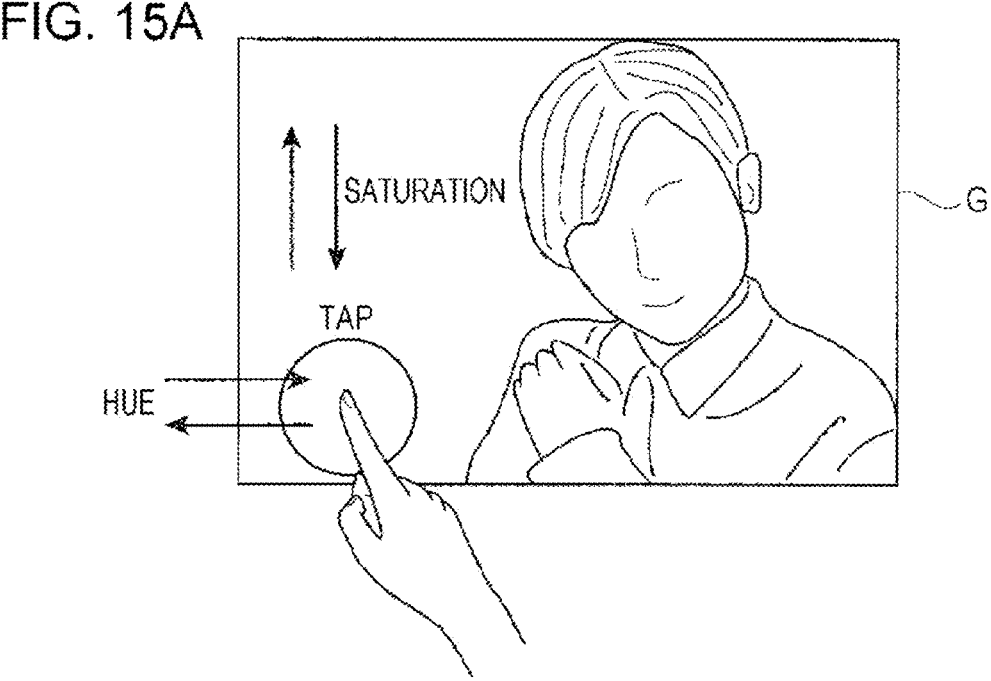
FIGS. 15A and 15B illustrate another example of frames displayed on a display screen when performing adjustment of the hue, the saturation, and the value.
Figure 15B:
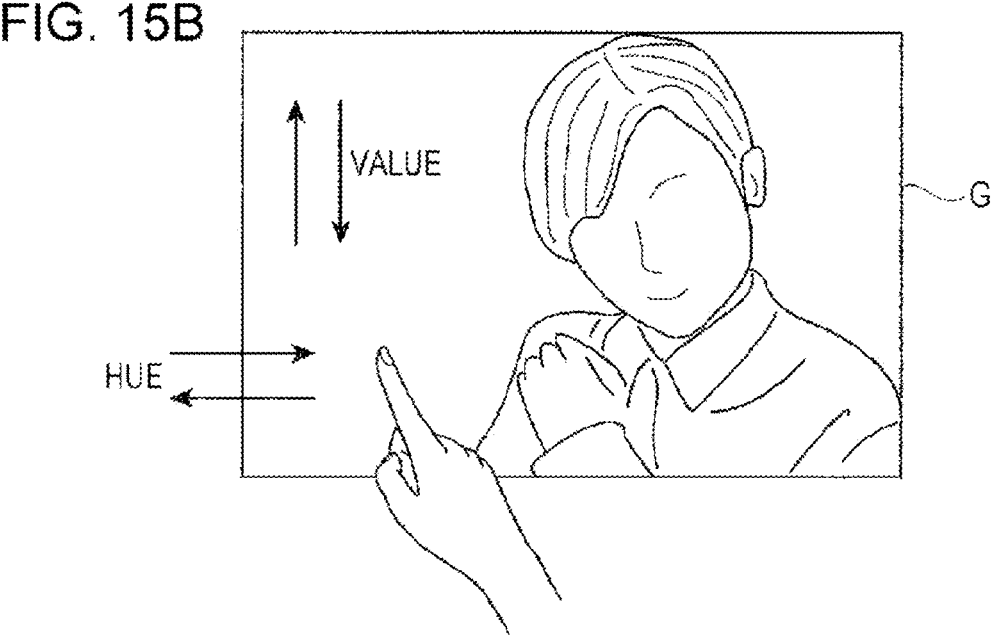

FIGS. 15A and 15B illustrate another example of frames displayed on the display screen 21 when adjustment of the hue (H), the saturation (S), and the value (V) is performed.

In the example shown in FIG. 15A, the user switches between elements to be adjusted by performing a tap operation. That is, if the input device 30 is a touch panel, when the user taps a certain portion of the display screen 21, elements to be adjusted are switched from the hue and the saturation to the hue and the value, and vice versa.

It is assumed that elements to be adjusted have been switched from the hue and the saturation shown in FIG. 15A to the hue and the value shown in FIG. 15B. In this case, as shown in FIG. 15B, when the user performs a swipe operation horizontally, the hue (H) is adjusted, and when the user performs a swipe operation vertically, the value (V) is adjusted. In this case, adjustment of the hue (H) is performed in a manner similar to the operation shown in FIG. 14. When the user performs a swipe operation in the upward direction, the value (V) of a specified region is increased. When the user performs a swipe operation in the downward direction, the value (V) of a specified region is decreased. The amount by which the hue (H) or the value (V) is adjusted may be changed by a distance by which a finger or a touch pen is moved or the number of times a finger or a touch pen is moved, in a manner similar to the operation discussed with reference to in FIG. 14.

Figure 16A:
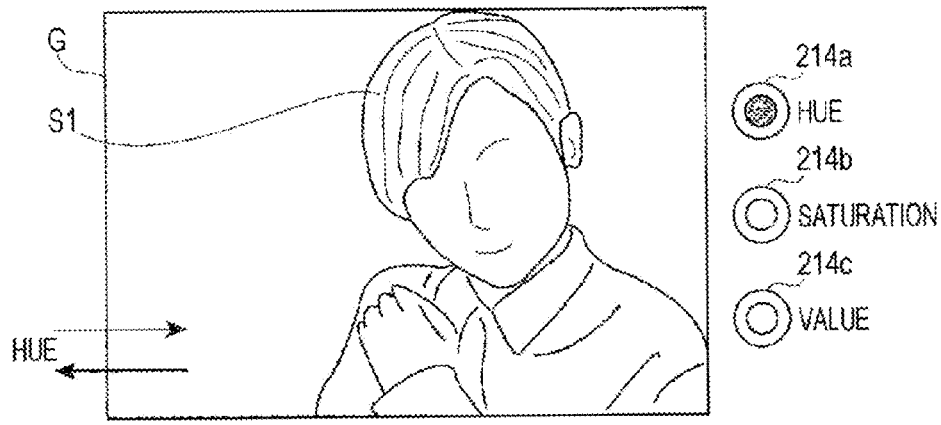
FIGS. 16A through 16C illustrate still another example of frames displayed on a display screen when performing adjustment of the hue, the saturation, and the value.
Figure 16B:
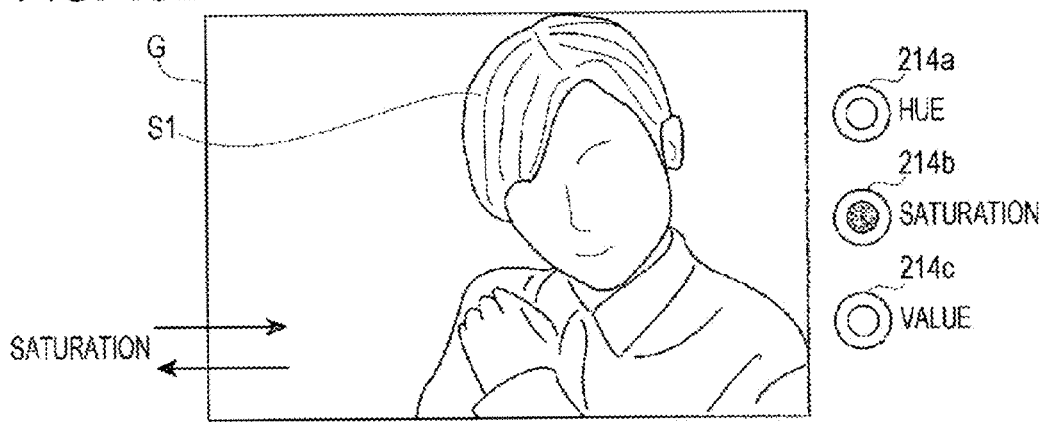
Figure 16C:
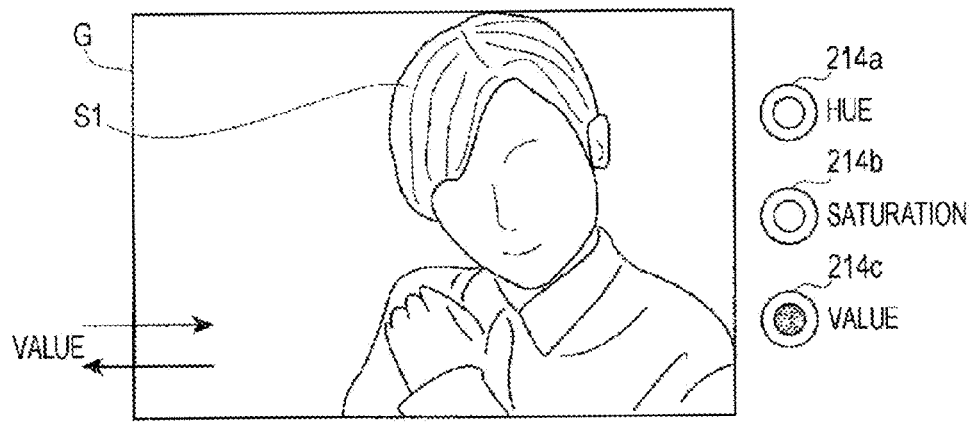

FIGS. 16A through 16C illustrate still another example of frames displayed on the display screen 21 when adjustment of the hue (H), the saturation (S), and the value (V) is performed.

In FIGS. 16A through 16C, an image G including the first specified region S1 which has been selected by a user is displayed at the left side of the display screen 21, and on the right side of the display screen 21, radio buttons 214a, 214b, and 214c corresponding to the hue, the saturation, and the value, respectively, are displayed. Then, when the user sequentially selects the radio buttons 214a, 214b, and 214c by using the input device 30, the hue, the saturation, and the value are switched as an element to be adjusted.

FIG. 16A illustrates a state in which the hue corresponding to the radio button 214a is being selected.

In this case, if the user moves a cursor or a finger horizontally, as stated above, the hue (H) is adjusted. That is, when the user performs a drag operation or a swipe operation in the right direction, the hue (H) of a specified region is increased. When the user performs a drag operation or a swipe operation in the left direction, the hue (H) of a specified region is decreased.

FIG. 16B illustrates a state in which the saturation corresponding to the radio button 214b is being selected. In this case, if the user moves a cursor or a finger horizontally, as stated above, the saturation (S) is adjusted in a manner similar to the adjustment of the hue (H).

FIG. 16C illustrates a state in which the value (V) corresponding to the radio button 214c is being selected. In this case, if the user moves a cursor or a finger horizontally, as stated above, the value (V) is adjusted in a manner similar to the adjustment of the hue (H).

Alternatively, a parameter focusing on the spatial frequency of an image may be set, and image processing for adjusting the spatial frequency by utilizing this parameter may be performed.

More specifically, the value V of each pixel is adjusted by using the following equation (9). In equation (9), (x, y) indicating the position of a pixel is omitted. In equation (9), $\alpha_g$ is a parameter representing the enhancement level, and $\alpha_B$ is a parameter representing the blurring bandwidth.

In this case, $V-V_B(\alpha_B)$ denotes an unsharpness component. $V_B$ denotes a smoothed image. If $\alpha_B$ is small, a resulting image has a small degree of blurring. If $\alpha_B$ is large, a resulting image has a large degree of blurring. Accordingly, if $\alpha_B$ is smaller, the unsharpness component $V-V_B(\alpha_B)$ has a higher frequency, and thus, the higher frequency is enhanced by using equation (9). As a result, fine, clear details of contours of a resulting image are reproduced. In contrast, if $\alpha_B$ is larger, the unsharpness component V−$V_B$ ($\alpha_B$) has a lower frequency, and thus, the lower frequency is enhanced by using equation (9). As a result, rough contours (configuration) of a resulting image are reproduced. In equation (9), since $\alpha_g$ is an enhancement level (gain), when $\alpha_g$ is small, the enhancement level is low, and when $\alpha_g$ is large, the enhancement level is high.

$$V'=V+\alpha_g(V-V_B(\alpha_B)) \qquad (9)$$

For example, concerning an image of the hair, high frequency components enhance the texture of the hair, and thus, control of the blurring bandwidth is effective.

Figure 17:
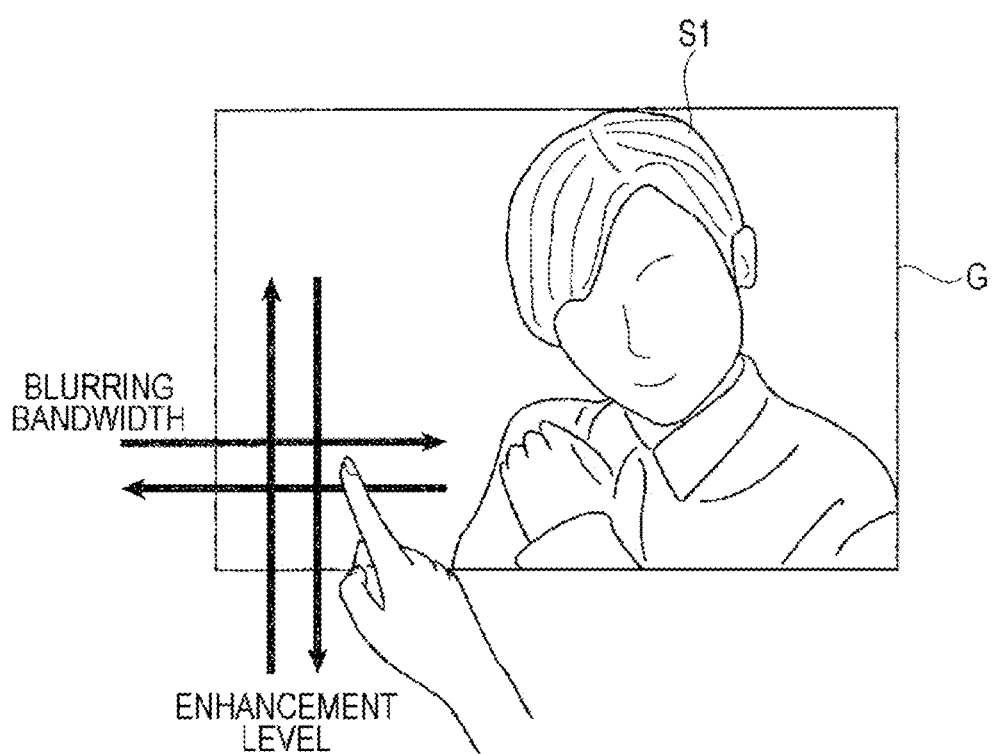
FIG. 17 illustrates an example of a frame displayed on a display screen when performing adjustment of the spatial frequency.

FIG. 17 illustrates an example of a frame displayed on the display screen 21 when performing adjustment of the spatial frequency.

In FIG. 17, the first specified region (S1), which is the hair portion, is being selected. When the user performs a drag or swipe operation horizontally by using a cursor or a finger, the blurring bandwidth $\alpha_B$ is adjusted. More specifically, when the user moves a cursor or a finger on the display screen 21 in the right direction, the blurring bandwidth $\alpha_B$ of the first specified region (S1) is shifted to a higher frequency. When the user shifts a cursor or a finger on the display screen 21 in the left direction, the blurring bandwidth $\alpha_B$ of the first specified region (S1) is shifted to a lower frequency.

When the user performs a drag or swipe operation vertically by using a cursor or a finger, the enhancement level $\alpha_g$ is adjusted. More specifically, when the user moves a cursor or a finger on the display screen 21 in the upward direction, the enhancement level $\alpha_g$ of the first specified region (S1) is increased. When the user moves a cursor or a finger on the display screen 21 in the downward direction, the enhancement level $\alpha_g$ of the first specified region (S1) is decreased.

Figure 18:
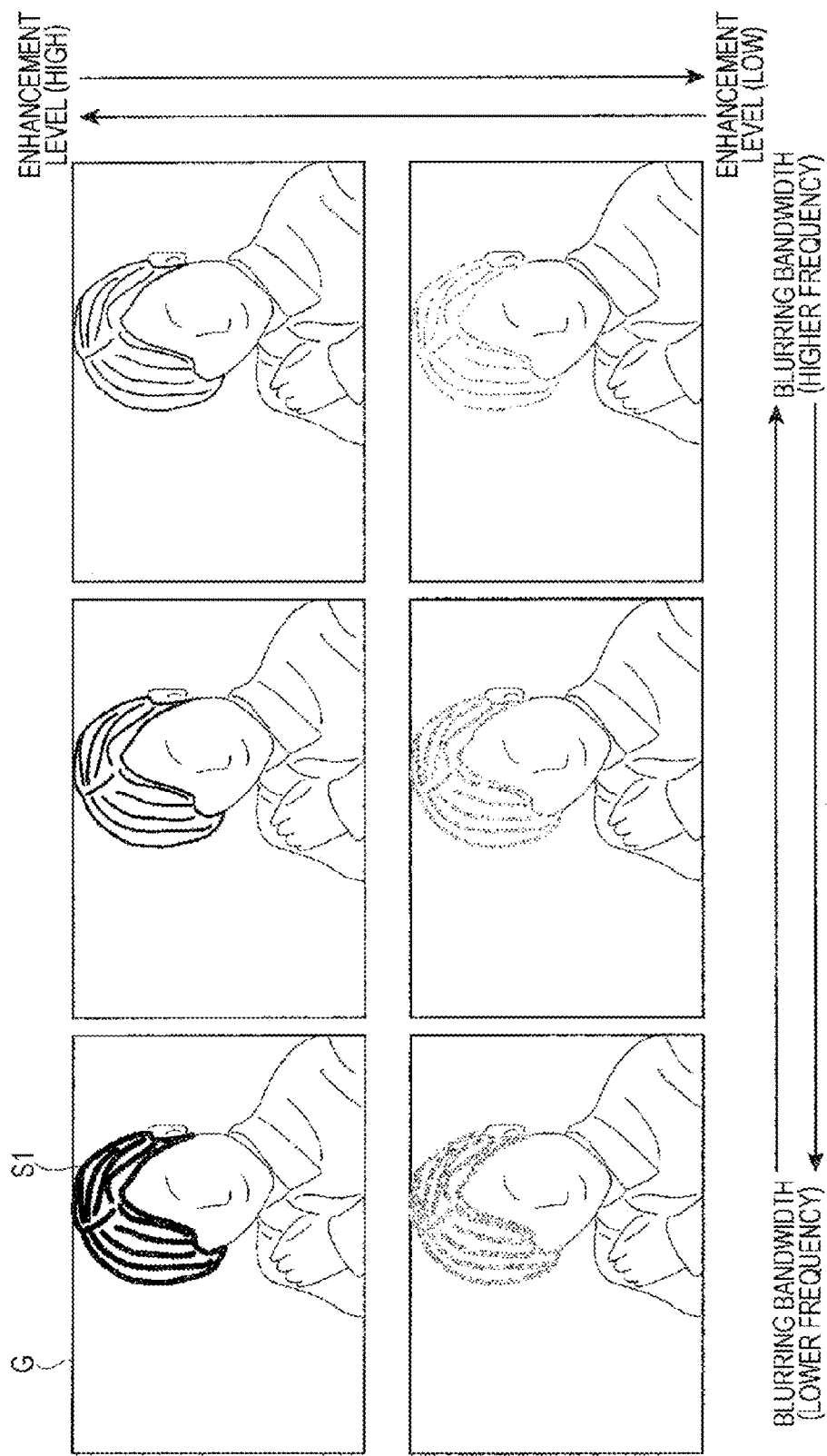
FIG. 18 illustrates images subjected to image processing obtained as a result of performing an operation shown in FIG. 17.

FIG. 18 illustrates images G subjected to image processing obtained as a result of the operation discussed with reference to FIG. 17.

When the blurring bandwidth $\alpha_B$ is adjusted so as to be shifted to a higher frequency (in the right direction in FIG. 18), the image of the hair portion, which is the first specified region (S1), appears sharper. When the blurring bandwidth $\alpha_B$ is adjusted so as to be shifted to a lower frequency (in the left direction in FIG. 18), the image of the hair portion, which is the first specified region (S1), appears less sharp.

When the enhancement level $\alpha_g$ is adjusted so as to be increased (in the upward direction in FIG. 18), the image of the hair portion, which is the first specified region (S1), becomes more enhanced. When the enhancement level $\alpha_g$ is adjusted so as to be decreased (in the downward direction in FIG. 18), the image of the hair portion, which is the first specified region (S1), becomes less noticeable.

Referring back to FIG. 2, the image information output unit 16 outputs image information indicating an image subjected to image processing as described above. Before outputting the image information, the image information output unit 16 re-converts the image information from HSV data into RGB data. The image information subjected to image processing is supplied to the display device 20. Then, on the basis of this image information, an image is displayed on the display device 20.

FIG. 19 is a flowchart illustrating an operation performed by the image processing apparatus 10 according to the first exemplary embodiment.

The operation of the image processing apparatus 10 will be discussed below with reference to FIGS. 2 and 19.

In step S101, the image information obtaining unit 11 obtains RGB data as image information representing a first image to be subjected to image processing. This RGB data is supplied to the display device 20 and the image that has not been subjected to image processing is displayed on the display device 20.

Then, in step S102, by using, for example, the method discussed with reference to FIG. 3, the user specifies image regions to be subjected to image processing by inputting seeds, for example, paths, by using the input device 30. Information concerning seeds indicating the specified regions is received by the user instruction receiver 12.

Then, in step S103, the region detector 13 performs processing for cutting the specified regions by using, for example, the method discussed with reference to FIGS. 4A and 4B, 5 or 6.

Then, in step S104, the user selects a specified region with the use of the input device 30 by employing the method shown in FIG. 7A through 7C or 8A through 8C.

An instruction concerning the selection of a specified region provided by the user is received by the user instruction receiver 12.

Then, in step S105, the specified region is switched by the region switching unit 14.

In step S106, the user inputs an instruction concerning image processing to be performed on the selected specified region by using the input device 30. In this case, the user may input an instruction by using sliders discussed with reference to FIG. 9. An instruction input by the user is received by the user instruction receiver 12.

Then, in step S107, the image processor 15 performs image processing on the selected specified region in response to an instruction from the user.

Then, in step S108, the image information output unit 16 outputs image information subjected to image processing. This image information is RGB data. The RGB data is supplied to the display device 20, and an image subjected to image processing is displayed on the display screen 21.

Second Exemplary Embodiment

A second exemplary embodiment of the image processing apparatus 10 will now be described below.

FIG. 20 is a block diagram illustrating an example of the functional configuration of the image processing apparatus 10 according to the second exemplary embodiment. Among various functions of the image processing apparatus 10, functions related to the second exemplary embodiment are selected and shown in FIG. 20.

The image processing apparatus 10 of the second exemplary embodiment includes, as shown in FIG. 20, an image information obtaining unit 11, a user instruction receiver 12, a region detector 13, a region switching unit 14, a parameter calculator 17, an image processor 15, and an image information output unit 16.

As shown in FIG. 20, the image processing apparatus 10 of the second exemplary embodiment differs from that of the first exemplary embodiment shown in FIG. 2 in that the parameter calculator 17 is disposed, in addition to the elements shown in FIG. 2.

In the second exemplary embodiment, in addition to a first image to be subjected to image processing, a second image, which serves as a model, is provided. Then, image processing for adjusting the quality of the first image to that of the second image is performed.

This will be discussed below.

The image information obtaining unit 11 obtains image information concerning the second image, which serves as a model, in addition to the first image to be subjected to image processing. Image information concerning the second image is data similar to that of the first information, for example, RGB video data (RGB data).

The user instruction receiver 12 receives an instruction concerning image processing to be performed input by a user using the input device 30, in a manner similar to the first exemplary embodiment.

In the second exemplary embodiment, the user instruction receiver 12 also receives, as user instruction information, an instruction concerning the second image, which serves as a model, input by the user using the input device 30, as well as an instruction concerning the first image. This will be discussed in detail later.

The region detector 13, not only detects specified regions from the first image, but also detects model regions from the second image. These model regions are image regions, which serve as model images used by the user to perform image processing on the specified regions. The region detector 13 also performs processing for cutting these model regions from the second image displayed on the display device 20.

In the second exemplary embodiment, model regions may also be cut user-interactively, as discussed with reference to FIG. 3.

FIG. 21 illustrates an example of a technique for cutting specified regions and model regions user-interactively. In this example, an image G1, which is the first image, is displayed at the left side of the display screen 21 of the display device 20, and an image G2, which is the second image, is displayed at the right side of the display screen 21.

The image G1 at the left side of the display screen 21 is similar to the image G shown in FIG. 3 and is a photo image constituted by a person shown as a foreground and a background shown behind the person. The user selects a hair portion, a face portion, and a portion other than the hair portion and the face portion of the person as the foreground as specified regions.

In this case, the user provides seeds, such as paths or dots, to each of the hair portion, the face portion, and the portion other than the hair portion and the face portion. Then, on the basis of position information (first position information) indicating the seeds, the region detector 13 performs processing for cutting the specified regions.

The image G2 at the right side of the display screen 21 is also a photo image constituted by a person shown as a foreground and a background shown behind the person. The user selects a hair portion, a face portion, and a portion other than the hair portion and the face portion of the person as the foreground as model regions.

At this time, the user also provides seeds, such as paths or dots, to each of the hair portion, the face portion, and the portion other than the hair portion and the face portion, to the image G2 as well as to the image G1. Position information (second position information) indicating the seeds is obtained by the user instruction receiver 12 as user instruction information. Then, on the basis of this position information (second position information), the region detector 13 performs processing for cutting the model regions. Hereinafter, the model region of the hair portion may be referred to as a "first model region", the model region of the face portion may be referred to as a "second model region", and the model region of the portion other than the hair portion and the face portion may be referred to as a "third model region".

That is, as in the case of the specified regions, the user provides a path of the hair portion, a path of the face portion, and a path of the portion other than the hair portion and the face portion, as representatives thereof. This may also be described such that a user inputs position information (second position information) indicating representative positions of the model regions.

Figure 22A:
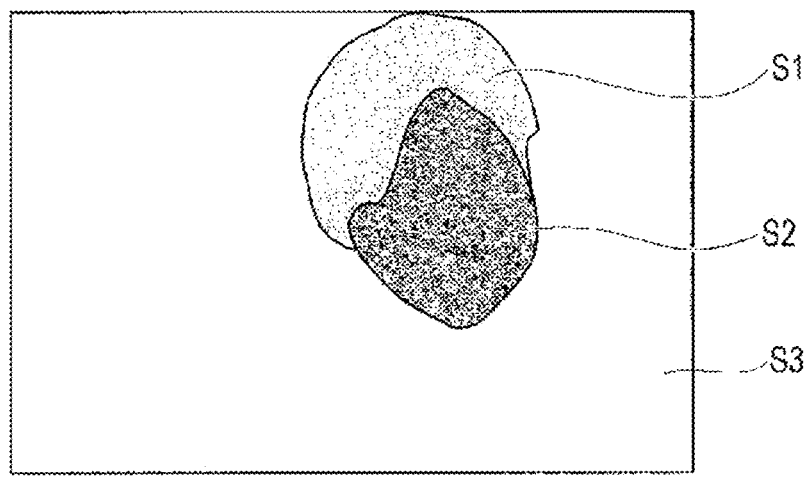
FIGS. 22A and 22B illustrate a state in which specified regions and model regions are being cut from the images shown in FIG. 21.
Figure 22B:
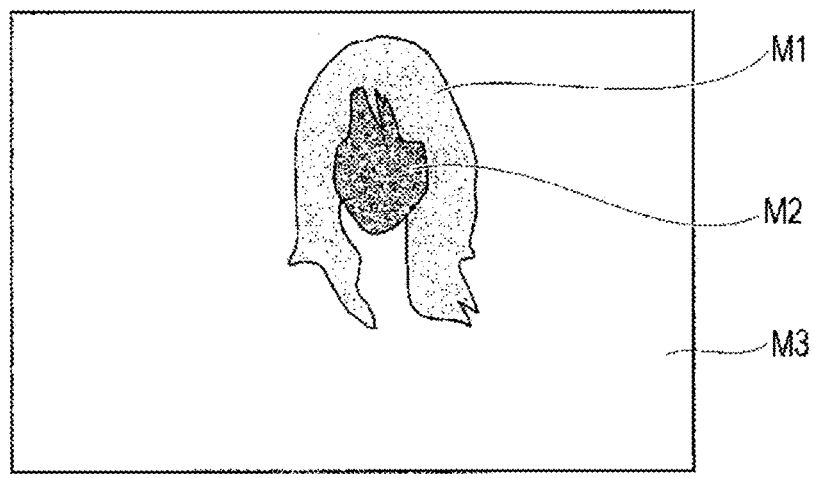

FIGS. 22A and 22B illustrate a state in which the specified regions and the model regions are respectively being cut from the images G1 and G2 shown in FIG. 21.

FIG. 22A illustrates a state in which three specified regions, that is, the first specified region (S1), the second specified region (S2), and the third specified region (S3), which are the hair portion, the face portion, and the portion other than the hair portion and the face portion, respectively, of the image G1 are being cut as specified regions.

FIG. 22B illustrates a state in which three model regions, that is, the first model region (M1), the second model region (M2), and the third model region (M3), which are the hair portion, the face portion, and the portion other than the hair portion and the face portion, respectively, of the image G2 are being cut as model regions.

As in the first exemplary embodiment, flags are added to pixels forming these specified regions and pixels forming these model regions, in the second exemplary embodiment. For example, a flag "1" is added to the pixels forming the hair portion, a flag "2" is added to the pixels forming the face portion, and a flag "3" is added to the pixels forming the portion other than the hair portion and the face portion.

If there are plural specified regions and plural model regions, the region switching unit 14 switches between the specified regions and between the model regions. That is, a user selects a specified region for which the user wishes to perform image adjustment and a model region that the user wishes to use as a model. The region switching unit 14 then switches between the specified regions in accordance with a specified region and a model region selected by the user. The selection of specified regions and model regions may be made by the use of an image switching button or radio buttons, as discussed in the first exemplary embodiment.

The results of performing operations on an image switching button or radio buttons are obtained by the user instruction receiver 12 as user instruction information, and the region switching unit 14 switches between the specified regions and the model regions accordingly.

The parameter calculator 17 calculates parameters for adjusting the image quality of a selected specified region to that of a selected model region.

In this case, though various types of parameters may be utilized, a technique for determining parameters for controlling two elements, that is, the hue and the saturation, will be discussed below.

It is now assumed that the pixel value of a pixel located at a position (x, y) of a selected specified region is given by HSV data and that it is represented by $H_1(x, y)$, $S_1(x, y)$, and $V_1(x, y)$. Similarly, it is also assumed that the pixel value of a pixel located at a position (x, y) of a selected model region is represented by $H_2(x, y)$, $S_2(x, y)$, and $V_2(x, y)$.

The average hue value $H_1$ave and the average saturation value $S_1$ave of the selected specified region may be calculated by equations (10). In equations (10), $N_1$ is the number of pixels within the selected specified region and $D_1$ is the selected specified region.

$$H_1 ave = \frac{1}{N_1} \sum_{D_1} H_1(x, y) \quad (10)$$

$$S_1 ave = \frac{1}{N_1} \sum_{D_1} S_1(x, y)$$

The average hue value $H_2 ave$ and the average saturation value $S_2 ave$ of the selected model region may be calculated by equations (11). In equations (11), $N_2$ is the number of pixels within the selected model region and $D_2$ is the selected model region.

$$H_2 ave = \frac{1}{N_2} \sum_{D_2} H_2(x, y) \quad (11)$$

$$S_2 ave = \frac{1}{N_2} \sum_{D_2} S_2(x, y)$$

Then, on the basis of the average hue values $H_1 ave$ and $H_2 ave$, a parameter for relating $H_1(x, y)$ to $H_2(x, y)$ is set, and on the basis of the average saturation values $S_1 ave$ and $S_2 ave$, a parameter for relating $S_1(x, y)$ to $S_2(x, y)$ is set.

Figure 23:
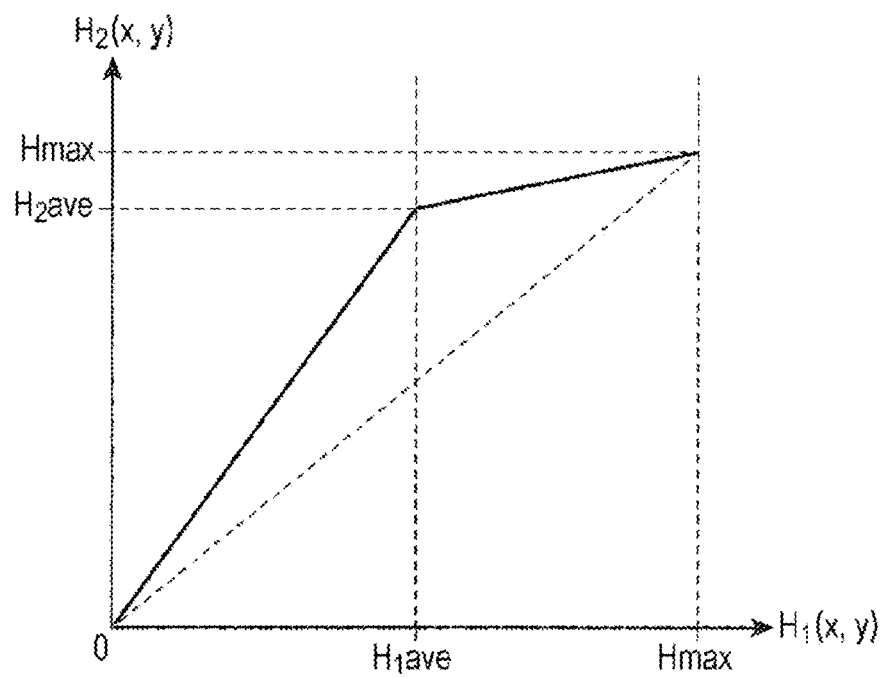
FIG. 23 illustrates a function for setting a parameter for relating $H_1(x, y)$ to $H_2(x, y)$.

FIG. 23 illustrates a function for setting a parameter for relating $H_1(x, y)$ to $H_2(x, y)$.

In FIG. 23, the horizontal axis indicates $H_1(x, y)$, and the vertical axis indicates $H_2(x, y)$. Then, a function represented by the thick line shown in FIG. 23 constituted by a line connecting a point ($H_1 ave$ and $H_2 ave$) and the minimum value (0, 0) of the hue and a line connecting the point ($H_1 ave$ and $H_2 ave$) and the maximum value (Hmax, Hmax) of the hue is set. In this case, the parameter for relating $H_1(x, y)$ to $H_2(x, y)$ may be defined as gradients of these two straight lines.

In the example shown in FIG. 23, the function for setting a parameter for relating $H_1(x, y)$ to $H_2(x, y)$ has been discussed. A parameter for relating $S_1(x, y)$ to $S_2(x, y)$ may be defined in a similar manner.

Not only the parameters for controlling the two elements, that is, the hue and the saturation, but also a parameter for controlling the value may be set. Additionally, a parameter for another element that determines the image quality may be considered and set.

The image processor 15 performs image processing for adjusting the image quality of a selected specified region to that of a selected model region. In this case, the image processor 15 performs this image processing on the basis of parameters calculated by the parameter calculator 17.

Figure 24B:
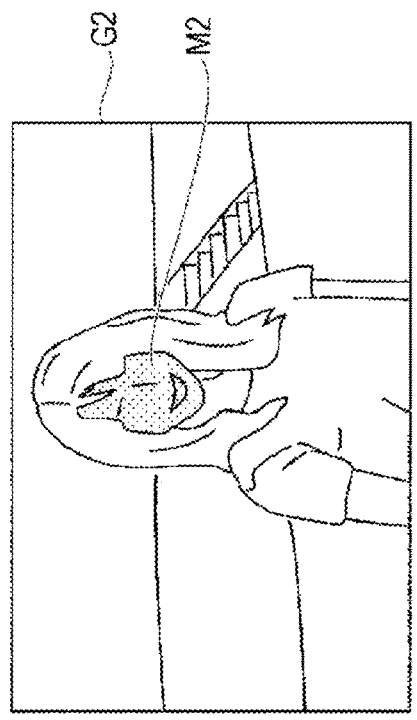
FIGS. 24A through 24C illustrate how an image is changed when image processing for adjusting the image quality of a selected specified region to that of a selected model region is performed.
Figure 24A:
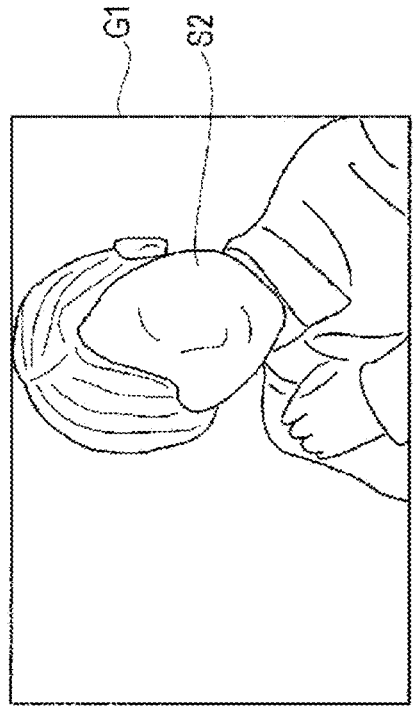
Figure 24C:
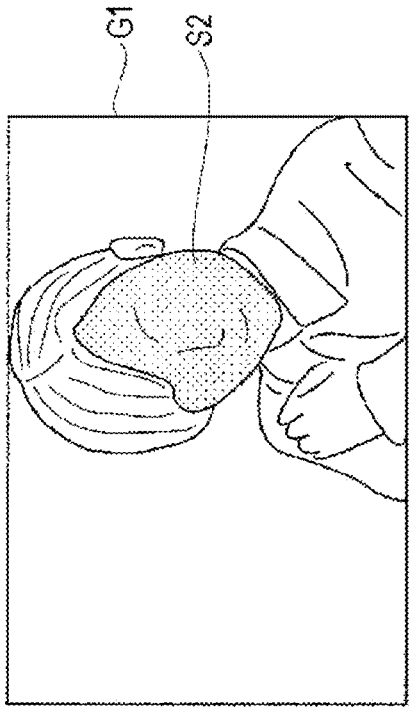

FIGS. 24A through 24C illustrate how an image is changed when image processing for adjusting the image quality of a selected specified region to that of a selected model region is performed.

FIG. 24A illustrates an image G1 which has not been subjected to image processing. Then, the image quality of a second specified region (S2), which is the face portion of the image G1, is adjusted to that of a second model region (M2), which is the face portion of the image G2, shown in FIG. 24B. As a result, the image quality of the face portion, which is the second specified region (S2), is changed to that of the second model region (M2) as shown in FIG. 24C.

FIG. 25A illustrates a case in which image processing for adjusting the image quality of the first specified region (S1), which is the hair portion, to that of the first model region (M1) and image processing for adjusting the image quality of the second specified region (S2), which is the face portion, to that of the second model region (M2) are performed at the same time.

Check boxes 215, such as those shown in the lower part of FIG. 25A are provided, and the image quality of a region of a check box 215 checked by the user is changed. In this case, by checking the check box 215 for a region 1, image processing for adjusting the image quality of the first specified region (S1) to that of the first model region (M1) is performed, and by checking the check box 215 for a region 2, image processing for adjusting the image quality of the second specified region (S2) to that of the second model region (M2) is performed. In this manner, image processing for the first specified region (S1) and that for the second specified region (S2) are performed at the same time.

FIG. 25B illustrates a case in which image processing is performed as a result of a user performing a swipe operation with a finger on the display screen 21 shown in FIG. 25A.

In this case, when the user swipes the display screen 21 in the left direction, the image quality approximates to that of a specified region, and when the user swipes the display screen 21 in the right direction, the image quality approximates to that of a model region. Since the check box 215 for the region 1 and that for the region 2 are checked, the image quality is changed between the first specified region (S1) and the first model region (M1), and at the same time, the image quality is changed between the second specified region (S2) and the second model region (M2). The technique for adjusting the image quality discussed with reference to FIG. 25B is also applicable to a case in which the check boxes 215 are not provided, as shown in FIG. 24.

Alternatively, a parameter focusing on the spatial frequency of an image may be set, and by adjusting the spatial frequency of a selected specified region to that of a selected model region by using this parameter, the image quality of the selected specified region may be adjusted to that of the selected model region.

This will be discussed more specifically. For the unsharpness component $V-V_B(\alpha_B)$ in the above-described equation (9), blurring bandwidths $\alpha_B$ are set in a stepwise manner from a low frequency to a high frequency. In this case, three blurring bandwidths $\alpha_{B1}$, $\alpha_{B2}$, and $\alpha_{B3}$ are set.

It is assumed that the pixel value of a pixel representing a high frequency component of an image is indicated by $I_{high}$, the pixel value representing a pixel of an intermediate frequency component of an image is indicated by $I_{mid}$, and the pixel value representing a pixel of a low frequency component of an image is indicated by $I_{low}$. In this case, $T_{high}$, $I_{mid}$, and $I_{low}$ are defined by equations (12).

$$I_{high} = V - V_{B1}(\alpha_{B1})$$

$$I_{mid} = V_{B1}(\alpha_{B1}) - V_{B2}(\alpha_{B2})$$

$$I_{low} = V_{B2}(\alpha_{B2}) - V_{B3}(\alpha_{B3}) \quad (12)$$

Then, thresholds are provided for pixel values of an image for which the three blurring bandwidths $\alpha_{B1}$, $\alpha_{B2}$, and $\alpha_{B3}$ are set, and pixels equal to or higher than these thresholds are extracted. The extracted pixels $T_{high}$, and $I_{low}$ are set to be $I_{high}(x, y)$, $I_{mid}(x, y)$, and $I_{low}(x, y)$ ((x, y) is a position at an extracted pixel), respectively. Then, the intensity levels of frequency components within a certain region are indicated by $T_{high}$, $T_{mid}$, or $T_{low}$. If $T_{high}$, $T_{mid}$, and $T_{low}$ are considered as the average values of $I_{high}(x, y)$, $I_{mid}(x, y)$, and $I_{low}(x, y)$, respectively, they may be defined by equations (13). In equations (13), N is the number of extracted pixels within this region and D is this region.

$$T_{high} = \frac{1}{N} \sum_D I_{high}(x, y) \quad (13)$$

$$T_{mid} = \frac{1}{N} \sum_D I_{mid}(x, y)$$

$$T_{low} = \frac{1}{N} \sum_D I_{low}(x, y)$$

In order to adjust the image quality of a selected specified region to that of a model region, the values of $T_{high}$, $T_{mid}$, and $T_{low}$ of the selected specified region are respectively adjusted so as to approximate to those of the model region.

This will be explained more specifically. $T_{high}$, $T_{mid}$, and $T_{low}$ in equations (13) for a selected specified region and those for a selected model region are calculated. Then, among $T_{high}$, $T_{mid}$, and $T_{low}$ of each of the selected specified region and the selected model region, the greatest value is set to be a representative bandwidth thereof. In this case, it is assumed that $T_{high}$ (high frequency component) is a representative bandwidth. Then, $T_{high}$ of the selected specified region is indicated by $T^O_{high}$, and $T_{high}$ of the selected model region is indicated by $T^R_{high}$, and on the basis of the intensity ratio of $T^R_{high}$ to $T^O_{high}$, the enhancement level $\alpha_g$ used in equation (9) may be calculated. The enhancement level $\alpha_g$ is expressed by equation (14).

$$\alpha_g = \frac{T^R_{high}}{T^O_{high}} \quad (14)$$

By calculating equation (9) by using this enhancement level $\alpha_g$, the spatial frequency of the selected specified region is adjusted to that of the selected model region. As a result, it is possible to adjust the image quality of the selected specified region to that of the selected model region.

Figure 26A:
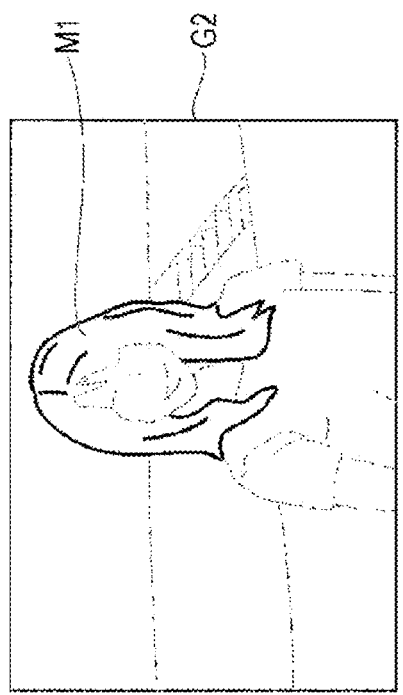
FIGS. 26A through 26C illustrate processing for adjusting the spatial frequency of a selected specified region to that of a selected model region.
Figure 26B:
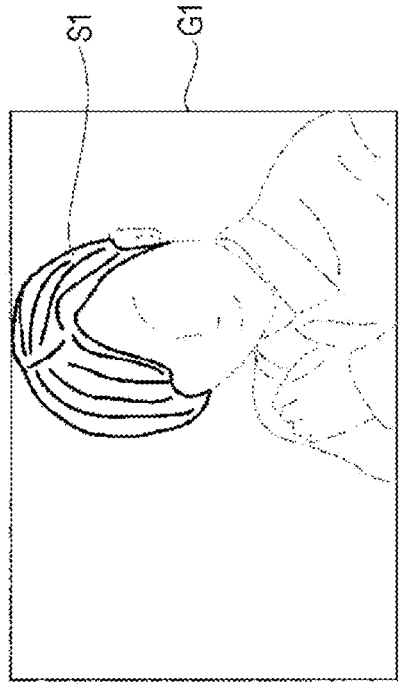
Figure 26C:
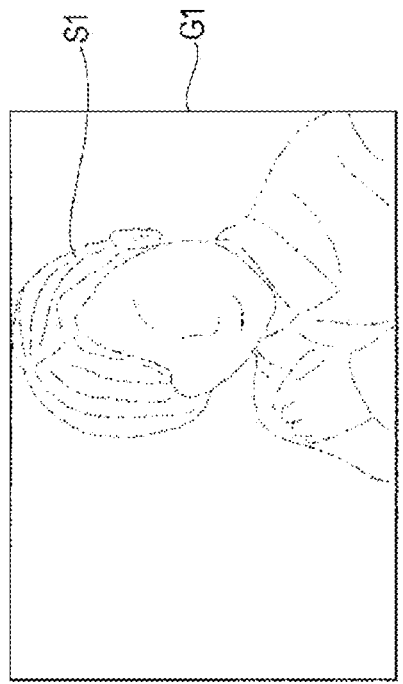

FIGS. 26A through 26C illustrate processing for adjusting the spatial frequency of a selected specified region to that of a selected model region.

FIG. 26A illustrates an image G1, which is a first image to be subjected to image processing, and illustrates a state in which the first specified region (S1), which is the hair portion, is being selected.

FIG. 26B illustrates an image G2, which is a second image serving as a model image, and illustrates a state in which the first model region (M1), which is the hair portion, is being selected.

FIG. 26C illustrates the image G1 obtained as a result of adjusting the image quality of the first specified region (S1) to that of the first model region (M1) by adjusting the spatial frequency of the first specified region (S1) to that of the first model region (M1).

The image information output unit 16 has a function similar to that of the first exemplary embodiment.

Figure 27:
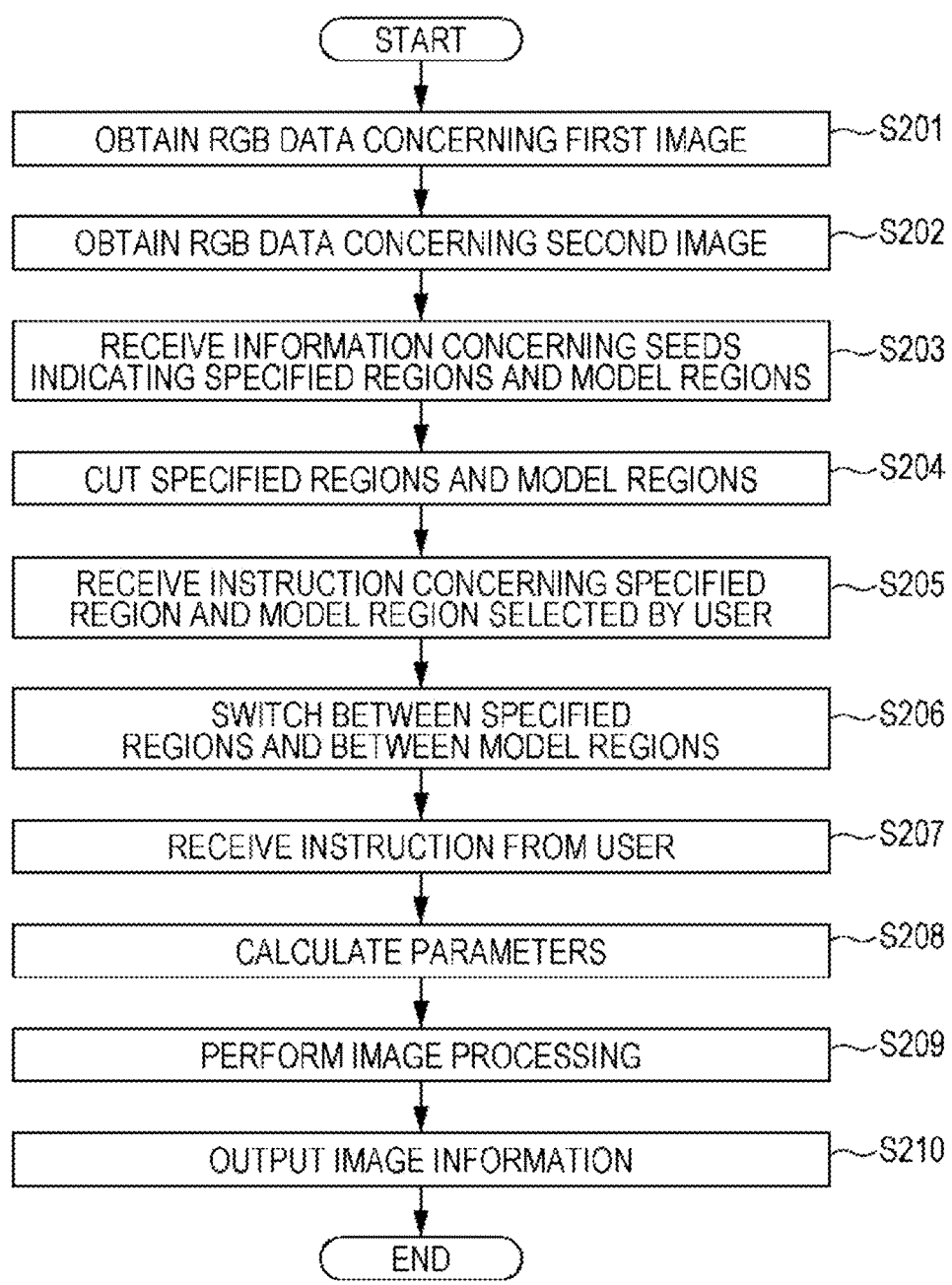
FIG. 27 is a flowchart illustrating an operation performed by the image processing apparatus according to the second exemplary embodiment.

FIG. 27 is a flowchart illustrating an operation performed by the image processing apparatus 10 according to the second exemplary embodiment.

The operation of the image processing apparatus 10 will be discussed below with reference to FIGS. 20 and 27.

In step S201, the image information obtaining unit 11 obtains RGB data as image information representing a first image to be subjected to image processing. In step S202, the image information obtaining unit 11 also obtains RGB data as image information representing a second image, which serves as a model image. These items of RGB data are supplied to the display device 20 and images that have not been subjected to image processing are displayed on the display device 20.

Then, in step S203, the user specifies image regions to be subjected to image processing by inputting seeds, for example, paths, by using the input device 30. The user similarly specifies model regions by inputting seeds, for example, paths, by using the input device 30.

Information concerning these seeds indicating the specified regions and the model regions is received by the user instruction receiver 12.

Then, in step S204, the region detector 13 performs processing for cutting the specified regions and the model regions.

Then, in step S205, the user selects a specified region and a model region with the use of the input device 30.

An instruction concerning a specified region and a model region selected by the user is received by the user instruction receiver 12.

Then, in step S206, the specified regions and the model regions are switched by the region switching unit 14.

In step S207, the user inputs an instruction concerning image processing to be performed on the selected specified region by using the input device 30. In this case, the user may input an instruction by using, for example, sliders.

An instruction input by the user is received by the user instruction receiver 12.

In step S208, the parameter calculator 17 calculates parameters for adjusting the image quality of the selected specified region to that of the selected model region.

Then, in step S209, the image processor 15 performs image processing for adjusting the image quality of the selected specified region to that of the selected model region, on the basis of the calculated parameters.

Then, in step S210, the image information output unit 16 outputs image information subjected to image processing. This image information is RGB data. The RGB data is supplied to the display device 20, and an image subjected to image processing is displayed on the display screen 21.

Example of Hardware Configuration of Image Processing Apparatus

Figure 28:
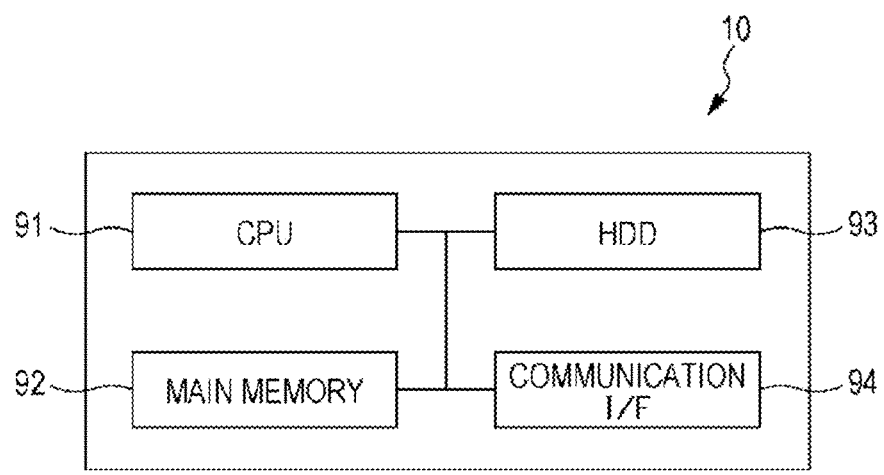
FIG. 28 illustrates an example of the hardware configuration of the image processing apparatus.

An example of the hardware configuration of the image processing apparatus 10 will be described below with reference to FIG. 28.

The image processing apparatus 10 is implemented by, for example, a PC, as discussed above. The image processing apparatus 10 includes, as shown in FIG. 28, a central processing unit (CPU) 91, which serves as an arithmetic unit, a main memory 92, which serves as a storage unit, and a hard disk drive (HDD) 93. The CPU 91 executes various programs, such as an OS and application software. The main memory 92 is a storage region in which various programs and data used for executing the programs are stored. The HDD 93 is a storage region in which data input into the various programs and data output from the various programs are stored.

The image processing apparatus 10 also includes a communication interface (hereinafter referred to as a "communication I/F") 94 for performing communication with external devices.

Description of Program

Processing executed by the image processing apparatus 10 of an exemplary embodiment of the invention may be provided as a program, such as application software.

Accordingly, processing executed by the image processing apparatus 10 may be considered as a program that implements a function of obtaining image information concerning a first image, a function of obtaining first position information indicating a representative position of a specified region which has been specified by a user from the first image as an image region to be subjected to image processing, a function of detecting the specified region from the first position information, and a function of performing image processing on the specified region.

The program implementing an exemplary embodiment of the invention may be provided by a communication medium. Alternatively, the program may be stored in a recording medium, such as a compact disc-read only memory (CD-ROM), and may be provided.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a processor and a memory configured to execute:
an image information obtaining unit configured to obtain a first image information concerning a first image and a second image information concerning a second image;
a region detector configured to detect a specified region from the first image information and a model region from the second image information;
a parameter calculator configured to calculate an amount of characteristic of the specified region from the first image information and an amount of characteristic of the model region from the second image information, the parameter calculator further calculating the parameter for adjusting an image quality of the specified region to an image quality of the model region on the basis of both of the amount of characteristic of the specified region and that of the model region;
an image processor configured to perform image processing on the specified region for adjusting the image quality of the specified region to the image quality of the model region, on the basis of the calculated parameter; and
a display configured to display a first image, corresponding to the first image information, and a second image, corresponding to the second image information, at a same time, wherein
in response to a user input to the display in a direction of the first image, the image quality is approximated as the specified region, and in response to the user input to the display in a direction of the second image, the image quality is approximated as the model region.

2. The image processing apparatus according to claim 1, wherein:
a plurality of specified regions are provided at a same time; and
the image processing apparatus further comprises a region switching unit configured to switch between the plurality of specified regions.

3. An image processing method comprising:
obtaining a first image information concerning a first image and a second image information concerning a second image;
detecting a specified region from the first image information and a model region from the second image information;
calculating an amount of characteristic of the specified region from the first image information and an amount of characteristic of the model region from the second image information and calculating the parameter for adjusting an image quality of the specified region to an image quality of the model region on the basis of both of the amount of characteristic of the specified region and that of the model region;
performing image processing on the specified region for adjusting the image quality of the specified region to the image quality of the model region, on the basis of the calculated parameter;
displaying the first image and the second image on a display at a same time, wherein
in response to a user input to the display in a direction of the first image, the image quality is approximated as the specified region, and in response to the user input to the display in a direction of the second image, the image quality is approximated as the model region.

4. An image processing system comprising:
a display device configured to display a first image;
an image processing apparatus configured to perform image processing on image information concerning the first image displayed on the display device; and
an input device configured to receive an instruction from a user concerning image processing into the image processing apparatus,
the image processing apparatus including
an image information obtaining unit configured to obtain a first image information concerning the first image and a second image information concerning a second image,
a region detector configured to detect a specified region from the first image information and a model region from the second image information,
a parameter calculator configured to calculate an amount of characteristic of the specified region from the first image information and an amount of characteristic of the model region from the second image information, the parameter calculator further calculating the parameter for adjusting an image quality of the specified region to an image quality of the model region on the basis of both of the amount of characteristic of the specified region and that of the model region, and
an image processor configured to perform image processing on the specified region for adjusting the image quality of the specified region to the image quality of the model region, on the basis of the calculated parameter; wherein
the display device is configured to display the first image and the second image at a same time, and
in response to a user input to the display device in a direction of the first image, the image quality is approximated as the specified region, and in response to the user input to the display in a direction of the second image, the image quality is approximated as the model region.

5. A non-transitory computer readable medium storing a program causing a computer to execute a process, the process comprising:
    obtaining a first image information concerning a first image and a second image information concerning a second image;
    detecting a specified region from the first image information and a model region from the second image information;
    calculating an amount of characteristic of the specified region from the first image information and an amount of characteristic of the model region from the second image information and calculating the parameter for adjusting an image quality of the specified region to an image quality of the model region on the basis of both of the amount of characteristic of the specified region and that of the model region; and
    performing image processing on the specified region for adjusting the image quality of the specified region to the image quality of the model region, on the basis of the calculated parameter; and
    displaying the first image and the second image on a display at a same time, wherein
    in response to a user input to the display in a direction of the first image, the image quality is approximated as the specified region, and in response to the user input to the display in a direction of the second image, the image quality is approximated as the model region.

6. The image processing apparatus according to claim 2, wherein the plurality of specified regions are displayed at a same time.

7. The image processing apparatus according to claim 1, further comprising:
    a position information obtaining unit configured to obtain the first position information indicating a representative position of a specified region which has been specified by a user from the first image as an image region to be subjected to image processing, wherein
    the position information obtaining unit is further configured to obtain the second position information indicating a representative position of the model region which has been specified by the user from the second image as an image region serving as the model used for image processing to be performed on the specified region of the first image.

8. The image processing method according to claim 3, further comprising:
    obtaining the first position information indicating a representative position of a specified region which has been specified by a user from the first image as an image region to be subjected to image processing, wherein
    the obtaining includes obtaining the second position information indicating a representative position of the model region which has been specified by the user from the second image as an image region serving as the model used for image processing to be performed on the specified region of the first image.

9. The image processing apparatus according to claim 4, wherein the image processing apparatus further includes:
    a position information obtaining unit configured to obtain the first position information indicating a representative position of a specified region which has been specified by a user from the first image as an image region to be subjected to image processing, wherein
    the position information obtaining unit is further configured to obtain the second position information indicating a representative position of the model region which has been specified by the user from the second image as an image region serving as the model used for image processing to be performed on the specified region of the first image.

10. The non-transitory computer readable medium according to claim 5, further comprising:
    obtaining the first position information indicating a representative position of a specified region which has been specified by a user from the first image as an image region to be subjected to image processing, wherein
    the obtaining includes obtaining the second position information indicating a representative position of the model region which has been specified by the user from the second image as an image region serving as the model used for image processing to be performed on the specified region of the first image.

11. The image processing apparatus according to claim 1, wherein the first image is display on a left side of the display and the second image is displayed on a right side of the display.

* * * * *